United States Patent
Fracastoro et al.

(10) Patent No.: US 10,609,373 B2
(45) Date of Patent: Mar. 31, 2020

(54) METHODS AND APPARATUS FOR ENCODING AND DECODING DIGITAL IMAGES OR VIDEO STREAMS

(71) Applicants: SISVEL TECHNOLOGY S.R.L., None (IT); POLITECNICO DI TORINO, Turin (IT)

(72) Inventors: Giulia Fracastoro, Turin (IT); Enrico Magli, Turin (IT)

(73) Assignee: SISVEL TECHNOLOGY S.R.L., None (TO) (IT)

(*) Notice: Subject to any disclaimer, the term of this patent is extended or adjusted under 35 U.S.C. 154(b) by 0 days.

(21) Appl. No.: 15/759,631

(22) PCT Filed: Sep. 16, 2016

(86) PCT No.: PCT/IB2016/055526
§ 371 (c)(1),
(2) Date: Mar. 13, 2018

(87) PCT Pub. No.: WO2017/046750
PCT Pub. Date: Mar. 23, 2017

(65) Prior Publication Data
US 2018/0262759 A1    Sep. 13, 2018

(30) Foreign Application Priority Data

Sep. 18, 2015 (IT) .................. 102015000053132

(51) Int. Cl.
*H04N 19/126* (2014.01)
*H04N 19/14* (2014.01)
(Continued)

(52) U.S. Cl.
CPC ........... *H04N 19/126* (2014.11); *H04N 19/12* (2014.11); *H04N 19/14* (2014.11); *H04N 19/176* (2014.11);
(Continued)

(58) Field of Classification Search
CPC ...... H04N 19/12; H04N 19/126; H04N 19/14; H04N 19/176; H04N 19/182;
(Continued)

(56) References Cited

U.S. PATENT DOCUMENTS

2011/0206288 A1*  8/2011  Lee ...................... H04N 19/597
                                                      382/233
2011/0229024 A1*  9/2011  El-Maraghi ............. G06T 7/155
                                                      382/162
(Continued)

FOREIGN PATENT DOCUMENTS

JP        2014007477 A  *  1/2014
WO       2016/076659 A1     5/2019

OTHER PUBLICATIONS

Shen et al., Edge-Adaptive Transforms for Efficient Depth Map Coding, 2010, IEEE, pp. 566-569. (Year: 2010).*
(Continued)

*Primary Examiner* — Christopher S Kelley
*Assistant Examiner* — Kathleen M Walsh
(74) *Attorney, Agent, or Firm* — Workman Nydegger

(57) ABSTRACT

Methods and apparatuses for encoding and/or decoding digital images or video streams, wherein the encoding apparatus includes a processor configured for reading a portion of the image (f), computing difference values between pixel values of the image, quantizing such pixel difference values for obtaining a quantized weight map (W), computing an edge map (f') composed by elements ($f'_i$) indicating whether a corresponding pixel of the portion of the image is an edge or not on the basis of the quantized weight map, determining a reconstructed weight map (W') on the basis of the edge map (f'), determining a graph transform matrix (U) on the basis of the reconstructed weight map (W'), computing transform coefficients (f^) on the basis of the graph transform matrix (U) and said portion (Continued)

of the image (f), transmitting the computed transform coefficients (f^) and the edge map (f').

15 Claims, 15 Drawing Sheets

(51) Int. Cl.
    *H04N 19/176* (2014.01)
    *H04N 19/182* (2014.01)
    *H04N 19/60* (2014.01)
    *H04N 19/12* (2014.01)
    *H04N 19/463* (2014.01)
    *H04N 19/90* (2014.01)

(52) U.S. Cl.
    CPC ......... *H04N 19/182* (2014.11); *H04N 19/463* (2014.11); *H04N 19/60* (2014.11); *H04N 19/90* (2014.11); *B29C 2948/924* (2019.02); *B29C 2948/92209* (2019.02)

(58) Field of Classification Search
    CPC ...... H04N 19/463; H04N 19/60; H04N 19/90; B29C 2947/92209; B29C 2947/924; B29C 2948/92209; B29C 2948/924
    USPC .................................................. 375/240.18
    See application file for complete search history.

(56) References Cited

U.S. PATENT DOCUMENTS

| | | | | |
|---|---|---|---|---|
| 2013/0272422 | A1* | 10/2013 | Lee | H04N 19/176 375/240.18 |
| 2017/0318311 | A1* | 11/2017 | Said | H04N 19/103 |
| 2017/0339422 | A1 | 11/2017 | Said et al. | |
| 2017/0359581 | A1* | 12/2017 | Rusanovskyy | H04N 19/176 |
| 2018/0041760 | A1* | 2/2018 | Koo | H04N 19/96 |
| 2018/0220158 | A1* | 8/2018 | Koo | H04N 19/159 |
| 2018/0288407 | A1* | 10/2018 | Lee | H04N 19/107 |

OTHER PUBLICATIONS

International Search Report and Written Opinion dated Nov. 16, 2016, issued in PCT Application No. PCT/IB2016/055526, filed Sep. 16, 2016.
Giula Fracastoro et al., *Predictive Graph Construction for Image Compression*, 2015 IEEE International Conference on Image Processing (ICIP), Sep. 27, 2015, XP032826814, pp. 2204-2208.
Woo-Shik Kim et al., *Graph Based Transforms for Depth Video Coding*, 2012 IEEE International Conference on Acoustics, Speech and Signal Processing, Mar. 25-30, 2012, XP032227251, pp. 813-816.
Dong Liu et al., *Edge-Oriented Uniform Intra Prediction*, IEEE Transactions on Image Processing, vol. 17, No. 10, Oct. 1, 2008, XP011248122, pp. 1827-1836.
Sunil K. Narang et al., *Critically Sampled Graph-based Wavelet Transforms for Image Coding*, 2013 Asia-Pacific Signal and Information Processing Association Annual Summit and Conference, Oct. 29, 2013, XP032549595, pp. 4.
G. Shen et al., *Edge-Adaptive Transforms for Efficient Depth Map Coding*, Picture Coding Symposium 2010, Dec. 8-10, 2010, XP030082055, pp. 4.
David I. Shuman et al., *The Emerging Field of Signal Processing on Graphs: Extending High-Dimensional Data Analysis to Networks and Other Irregular Domains*, Signal Processing Magazine, IEEE, vol. 30, No. 3, pp. 83-98, 2013.
G. Taubin, *A Signal Processing Approach to Fair Surface Design*, in Proceedings of the 22nd annual conference on Computer graphics and interactive techniques, ACM, 1995, pp. 351-358.
Sandryhaila et al., *Nearest-Neighbor Image Model*, published in ICIP 2012 proceedings, pp. 4.
Sunil K. Narang et al., *Critically Sampled Graph-Based Wavelet Transforms for Image Coding*, APSIPA 2013 proceedings, pp. 4.

\* cited by examiner (a)

(b)

(a)

(b)

(a)

(b)

(c)

(a)

(b)

(c)

(a)

(b)

(a)

(b)

(a)

(b)

METHODS AND APPARATUS FOR ENCODING AND DECODING DIGITAL IMAGES OR VIDEO STREAMS

BACKGROUND OF THE INVENTION

Field of the Invention

The present invention relates to a method and an apparatus for encoding and/or decoding digital images; in particular, for coding and/or decoding digital images by means of the so-called graph-based transformations.

Description of Prior Art

The Discrete Cosine Transform (DCT) is the most common transform used for block-based image and video compression (see K. Sayood, *Introduction to data compression*, Newnes, 2012); indeed, the DCT is at the basis of popular video coding standards such as MPEG-2 (used, for example, for terrestrial and satellite standard definition video broadcasting and in the DVD storage format), H.264/AVC (used for high-definition video broadcasting, streaming over IP networks and in Blu-Ray discs) and in the recently standardized H.265/HEVC (expected to replace H.264/AVC in the above-mentioned scenarios).

One of the main drawbacks of the DCT is that when a block contains discontinuities, the resulting transform coefficients are not sparse and the high-frequency coefficients can have large magnitude. This leads to higher bitrate or reconstruction artifacts around the discontinuities. Recently, the graph-based approach has been proposed, according to which high-dimensional data naturally reside on the vertices of graphs and they can be visualized as a finite collection of samples defined as graph signals, with one sample at each vertex of the graph (see D. I. Shuman, S. K. Narang, P. Frossard, A. Ortega, and P. Vandergheynst, "The emerging field of signal processing on graphs: Extending high-dimensional data analysis to networks and other irregular domains," *Signal Processing Magazine*, IEEE, vol. 30, no. 3, pp. 83-98, 2013). In the last years, researchers have studied how to apply classical signal processing techniques in the graph domain. Techniques for filtering, translation, modulation and downsampling in the graph domain have been developed. Several graph transforms have also been proposed, such as the graph Fourier transform (G. Taubin, "A signal processing approach to fair surface design", in *Proceedings of the 22nd annual conference on Computer graphics and interactive techniques*, ACM, 1995, pp. 351-358).

In general, while graph-transforms have been shown to be more efficient than conventional block-based transforms, the overhead of graph transmission may easily outweigh the coding efficiency benefits. Therefore, it is very important to design graph representations and corresponding graph transforms that are efficient also when graph has to be transferred to a decoder.

Sandryhaila et al. in "Nearest-neighbor image model", published in *ICIP* 2012 *proceedings*, propose to represent an image as a graph of nodes and arcs, where the arcs weights are determined so as to minimize the expected distortion at the receiver. However, such work does not teach how to compress the weights graph, by making difficult to apply this technique in a real-world environment.

In U.S. patent application no. US 2011/206288 A1, Ortega et al. describe an image encoding and decoding system using graph based pixel prediction. This document teaches how to encode and decode pictures through a predictor selection, but it does not teach how to compress the weights graph, by making difficult to apply this technique in a real-world environment.

Kim, Narang and Ortega in "Graph based transforms for depth video coding", published in *ICASSP* 2012 *proceedings*, propose to find the optimal adjacency matrix and compress it using context-based adaptive binary arithmetic coding following a fixed order; however, also their work does not teaches how to compress the weights graph, by making difficult to apply this technique in a real-world environment.

Narang, Chao and Ortega in "Critically sampled graph-based wavelet transforms for image coding", published in *APSIPA* 2013 *proceedings*, propose to encode the image as a binary unweighted graph and encode it using JBIG of size (2N−1)×(N−1), where N is the number of pixels in the original image. This encoding scheme produces images having an high level of encoding noise, since the binary unweighted graph limits the quantity of information that can be encoded.

In order to better understand the limits of the state of the art, a brief description of how a graph-based encoding-decoding image system works is provided below.

The architecture of a graph-based encoding-decoding system according to the state of art is illustrated in FIG. 1 in terms of its basic functional units.

With reference to FIG. 1, it is assumed that an image f (or a block thereof) has both width and height equal to $\sqrt{N}$, so that it comprises N pixels ($\sqrt{N} \times \sqrt{N} = N$). Furthermore, it is assumed that f is encoded as a grayscale image, 8 bit per pixel, and that f can be also represented by a graph of vertices and arcs (V,A), wherein V are the pixels of the image, and A are the arcs that connect the pixels, defined according to some appropriate criteria. The graph describing the image pixels can be represented as a N×N matrix (i.e., a matrix having $N^2$ elements) that it is referred as weights matrix, as discussed later on.

FIG. 1 illustrates an image encoder 150 and an image decoder 170 based on the graph transform which aims to show the limitation of the current state of art about the transmission/memorization of the weights matrix W*.

The encoder 150 includes at least a weights graph generation unit 100, a graph Laplacian unit 110, and a graph transform unit 120.

The weights graph generation unit 100 takes as input said N-pixels image f, and generates the N×N weights matrix W* which is computed as described below.

In order to describe how the weights matrix W* is computed, it is assumed that $d_{i,j}$ represents the distance in the grayscale space between the i-th pixel $f_i$ and the j-th pixel $f_j$ of the image f, e.g., $d_{i,j}$ can be computed as the absolute difference between the values of the pixels $f_i$ and $f_j$:

$$d_{i,j} = |f_i - f_j|$$

Furthermore, it is assumed that each element of the weights matrix W* is computed by means of the following formula:

$$w_{i,j} = \frac{1}{1 + d_{i,j}} \quad (1)$$

$$i \in N \wedge 0 \leq i < N$$

$$j \in N \wedge 0 \leq j < N$$

It turns out that the value of the weight of the graph arc connecting pixels $f_i$ and $f_j$, i.e., $w_{i,j}$, will be close to 1 ("high" arc weight) if $f_i$ and $f_j$ are similar pixels, whereas the $w_{i,j}$ will be close to 0 ("low" arc weight) if $f_i$ and $f_j$ are dissimilar.

The graph Laplacian unit 110 generates the transform matrix U taking as input the weights matrix W. This unit is configured for reading W* and computing a diagonal matrix E having N×N dimensions such that the i-th element of its diagonal is equal to the sum of all the weights of all the arcs incident into the i-th pixel as described in W*; hence, E is defined in matrix notation as shown in the following:

$$E = \text{diag}(W^* \cdot V1)$$

$$V1 \in R^{N,1} \wedge (\forall x \in N, 1 \le x \le N | V1_{x,1} = 1)$$

After having computed at least part of the diagonal matrix E, the unit computes the matrix L (having N×N dimensions), as the difference between the diagonal matrix E and the weights matrix W*, i.e., matrix L is the Laplacian of W*. This computation step is summarized in matrix notation as shown below.

$$L = E - W^*$$

Finally, the unit computes the N×N matrix U known as transform matrix, wherein the rows of U are the eigenvectors of L, i.e., the rows of U are the vectors that allow to diagonalize L.

The graph transform unit 120 takes as input the image f (which is considered as a vector having N×1) and the transform matrix U, and computes the N×1 coefficients vector f^ via the matrix multiplication $$f^\wedge = U \cdot f$$

The encoder then transmits the transform matrix U (or, alternatively, the weights matrix W* from which U can be computed) and the coefficients vector f^ to the receiver node over a bandwidth constrained channel or memorizes them on a memory support for later use, e.g., for decoding purposes.

The decoder 170 includes, at least, a graph Laplacian unit 110 and inverse graph transform unit 180 configured for reading, from a storage device or through a communication channel, both the weights matrix W and the coefficients vector f^. For sake of simplicity, we assume that both W* and f^ available to the decoders 170 are identical to those generated by the encoders 150, since in practical applications adequate measures are taken for minimizing read/write or channel errors occurring during information transfer from the encoder to the decoder.

The graph Laplacian unit 110, which is functionally analogous to the counterpart found at the transmitter side, takes in input the weights matrix W* and generates the transform matrix U as described above for the encoder counterpart.

The inverse graph transform unit 180 takes U and f^ as inputs and recovers the original image f. In order to perform this task, the unit 180 internally inverts the matrix U by generating the N×N inverse transform matrix $U^{-1}$ which is, in the present case, equal to the transposed matrix $U^T$, since U is composed by the eigenvectors of the Laplacian matrix of W'; after that, the unit recovers the original image f via the following matrix multiplication which is known as the inverse graph Fourier transform:

$$f = U^{-1} \cdot f^\wedge$$

Clearly, this encoding-decoding approach makes necessary that the encoder conveys to the decoder both the weights matrix W*, whose dimension is in the order of $N^2$ elements, and the coefficients vector f^, whose dimension is in the order of N.

In real world applications, the communication takes place over a bandwidth constrained channels, it is hence desirable that either (or both) f^ and W* can undergo some effective form of compression prior they are put on the channel. The same applies to the memorization of the image f on a storage unit having limited capacity.

Regarding the problem of compressing the coefficients vector f^, its properties are such that it can be effectively compressed via existing entropy-based coding schemes. Conversely, the weights matrix W* cannot be effectively compressed by means of any of the existing compression techniques, since its properties do not enable efficient compression.

Please note than during the description of the prior art the weights matrix has been named W* since it is different with respect to those (named W and W') used in the invention. W* is unquantized and has been calculated according to a mathematical formula (1) directly from the distance matrix D without employing any particular weighting function and/or prediction technique. It must be transmitted in order to allow the decoder device to reconstruct the original image.

SUMMARY OF THE INVENTION

The present invention aims at solving these and other problems by providing a method and an apparatus for encoding and/or decoding digital images or video streams.

The basic idea of the present invention is to quantize each element of the weights matrix W*, preferably after each of said elements is processed (i.e., mapped) by means of a non-linear function and next to transmit a so called "edge map" in place of the more cumbersome weights matrix. This makes possible to reduce the number of bits necessary to represents each element of the weights matrix in a way so that it can be recovered at the receiver. Since, generally speaking, the values of the weight matrix W are more likely to be "high", i.e., to connect highly correlated pixels, each pixel of f is encoded as "edge" if at least one of the outgoing arcs has "low" value, and is encoded as "non-edge" otherwise. Next, the weights map can be encoded over a vector of bits of predefined size, preferably an exactly N bits vector, i.e., the edge map f' of the image, which represents the pixels of the image adjacent to a discontinuity. Other than being representable over a vector of N bits, whereas the weights matrix would require up to $N^2$ bits to be represented as a vector, the edge map also exhibits properties that make it suitable to be further compressed with existing entropy coding techniques (e.g., bitmap compression), furthering the compression efficiency.

The solution provided by the present invention makes possible to get reconstructed images having comparable quality than the ones processed by means of the solutions according to the state of the art but at a much lower bitrate.

Moreover, the present invention exploits inter-pixel prediction to further increase the compression ratio which enables a twofold reduction of the image coding rate over the approach proposed by Ortega et al. in the previously cited prior art document ("Critically sampled graph-based wavelet transforms for image coding", APSIPA 2013 *proceedings*).

BRIEF DESCRIPTION OF DRAWING

The characteristics and other advantages of the present invention will become apparent from the description of an embodiment illustrated in the appended drawings, provided purely by way of non limiting example, in which.

DETAILED DESCRIPTION OF THE INVENTION

In this description, any reference to "an embodiment" will indicate that a particular configuration, structure or feature described in regard to the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

Figure 2:
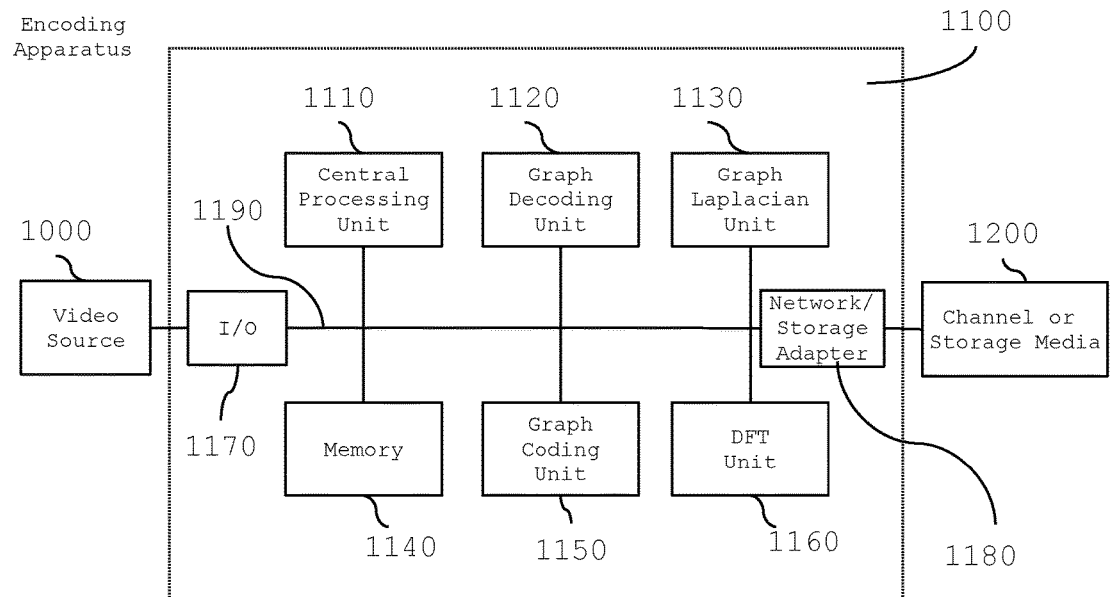
FIG. 2 shows a block diagram illustrating apparatuses for compressing/decompressing digital images or video streams according to the present invention.
Figure 2:
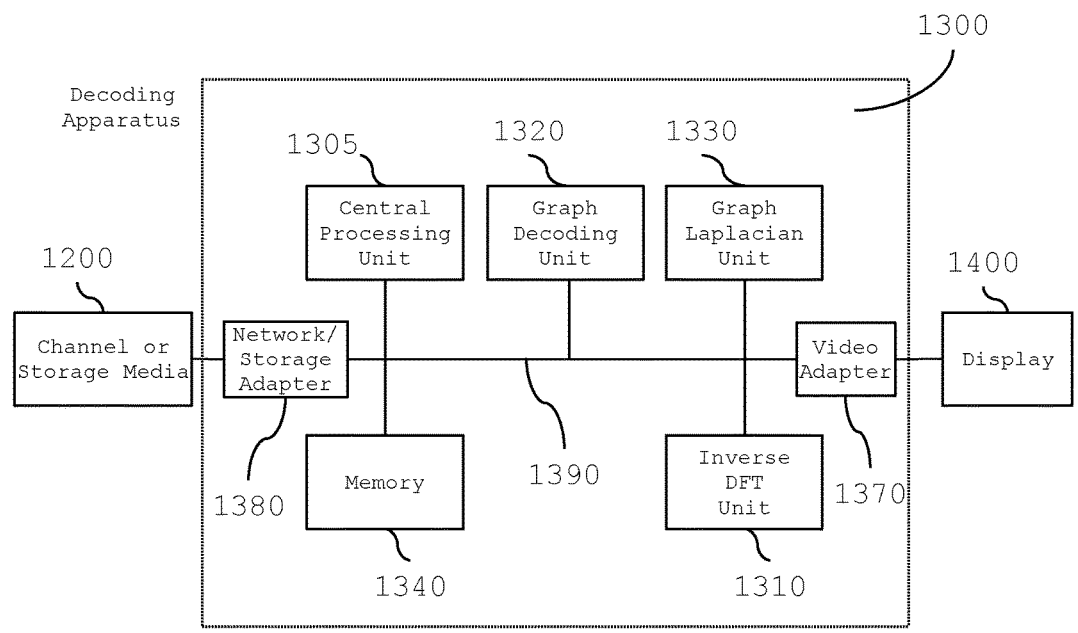

With reference to FIG. 2, an apparatus 1100 for compressing digital images or video streams (also named encoding apparatus 1100) comprises the following parts:

processing means 1110, like a Central Processing Unit (CPU), configured for executing a set of instruction for carrying out a method for encoding digital images or video streams according to the invention (said method will be described in details in the following of present description);

memory means 1140 containing data relating to the image to be compressed and preferably the instructions that implement the method for encoding digital images or video streams according to the invention, wherein the image data are a representation of at least a portion of said image and are preferably in binary format, and wherein said memory means 1140 may also contain the result of the execution of instructions of said method;

a graph decoding unit 1120, which is configured for executing the phases of the method for decompressing digital images or video streams according to the invention; in particular, this unit is configured for recovering the weights matrix W' and then storing it in the memory means 1140;

a graph Laplacian unit 1130, which is configured for fetching from the memory means 1140 the recovered weights graph W', computing the eigenvectors U, and storing said eigenvectors U in the memory 1140;

a graph coding unit 1150, which is configured for fetching the original image f from the memory, executing the phases of the method for encoding digital images or video streams according to the invention (illustrated in FIG. 6), and storing the resulting edge map f' back into the memory unit 1140;

a DFT (Discrete Fourier Transform) unit 1160 (also named graph transform unit), which is configured for computing transform coefficients f^ starting from the original image and the eigenvectors contained in the matrix U;

input means 1170 (e.g., I/O means), which can be can be configured by the CPU 1110 to read from a (video) source 1000 images or video streams to be processed; such input means may for example include an adapter according to at least one of the following standards: USB, Firewire, RS232, IEEE 1284, Ethernet, Wi-Fi, or the like;

output means 1180 (e.g., a network or storage adapter), which can be can be configured by the CPU 1110 to transmit, through a communication channel, the processing result to a destination 1200 (e.g., a storage media, a remote client or the like); such output means may for example include an adapter according to at least one of the following standards: Ethernet, SATA, SCSI, or the like;

a communication bus 1190, which allows the exchange of information between the CPU 1110, the graph decoding unit 1120, the graph Laplacian unit 1130, the memory means 1140, the graph coding unit 1150, the DFT unit 1160, the input means 1170, and the output means 1180.

As an alternative to using the communication bus 17, the CPU 1110, the graph decoding unit 1120, the graph Laplacian unit 1130, the memory means 1140, the graph coding unit 1150, the DFT unit 1160, the input means 1170, and the output means 1180 can be connected by means of a star architecture.

The video source 1000 can be either a provider of live images, such as a camera, or a provider of stored contents such as a disk or other storage and memorization devices. The Central Processing Unit (CPU) 1110 takes care of activating the proper sequence of operations performed by the units 1120, 1130, 1150, 1160 in the encoding process performed by the apparatus 1100. These units can be implemented by means of dedicated hardware components (e.g., CPLD, FPGA, or the like) or can be implemented through one or more sets of instructions which are executed by the CPU 1110; in the latter case, the units 1120, 1130, 1150, 1160 are just logical (virtual) units.

When the apparatus 1100 is in an operating condition, the CPU 1110 first fetches the image from the video source and loads it into the memory unit 1140. Next, the CPU activates the graph coding unit 1150, which fetches the original image f from the memory, executes the phases of the method for encoding images or video streams according to the invention (see FIG. 6), and stores the resulting edge map f' back into the memory unit 1140.

Then the CPU activates the graph decoding unit 1120, which fetches from the memory 1140 the edge map f', executes the phases of the method for decoding images or video stream according to the present invention (see FIG. 10, which is described in the following of the present description), and stores the recovered weights matrix W' in the memory 1140. Next, the CPU activates the graph Laplacian unit 1130, which fetches from the memory the recovered weights graph W', computes the eigenvectors U, and stores them into the memory 1140. At this point, the CPU may dispose of the recovered weights matrix W' from the memory because not required anymore at the encoder side 1100. Subsequently the CPU activates the DFT unit 1160, which fetches from the memory the eigenvectors U and computes the matrix of Fourier transform coefficients f^ which are stored in the memory unit 1140. At this point, the CPU may dispose of the eigenvectors U from the memory because not required anymore at the encoder. Finally, the CPU fetches the edge map f' and the transform coefficients f^ from memory and puts them into the channel or saves them into the storage media 1200.

With reference also to FIG. 2(*b*), an apparatus 1300 for decompressing digital images or video streams (also named decoding apparatus 1300) comprises the following parts:

- processing means 1305, like a Central Processing Unit (CPU), configured for executing a set of instruction for carrying out a method for decoding digital images or video streams according to the invention (said method will be described in details in the following of present description);
- memory means 1340 containing data relating to the compressed image received and preferably the instructions that implement the method for decompressing digital images or video streams according to the invention, wherein the image data are a representation of at least a portion of said image and are preferably in binary format, and wherein said memory means 1140 may also contain the result of the execution of instructions of said method;
- a graph decoding unit 1320, which is similar to graph decoding unit 1120 of the encoding apparatus 1100, and is configured for executing the phases of the method for decompressing digital images or video streams according to the invention; in particular, this unit is configured for recovering the weights matrix W' and then storing it into the memory means 1340;
- a graph Laplacian unit 1330, which is similar to graph Laplacian unit 1130 of the encoding apparatus 1100, and is configured for fetching from the memory means 1340 the recovered weights graph W', computing the eigenvectors U, and storing said eigenvectors U in the memory 1340;
- an IDFT (Inverse Discrete Fourier Transform) unit 1310, which is configured for fetching the eigenvectors U from the memory 1140, and transforming the coefficients f^ so as to recover the image f;
- output video means 1370, like a video adapter, which can be can be configured by the CPU 1110 to reproduce and/or output, preferably on a display 1400, the processed (decoded or decompressed) images or video streams; said output video means may for example include an adapter according to at least one of the following standards: VGA, S-video, HDMI, Ethernet or the like;
- input means 1380 (e.g., a network or storage adapter), which can be can be configured by the CPU 1110 to read the encoded images or video streams from a communication channel or storage media 1200; said input means 1380 may for example comprise an adapter according to at least one of the following standards: Ethernet, SATA, SCSI, or the like;
- a communication bus 1390, which allows the exchange of information between the CPU 1305, the graph decoding unit 1320, the graph Laplacian unit 1330, the memory means 1340, the output video means 1370, and the input means 1380.

As an alternative to using the communication bus 1390, the CPU 1305, the graph decoding unit 1320, the graph Laplacian unit 1330, the memory means 1340, the output video means 1370, and the network or storage adapter 1380 can be connected by means of a star architecture.

As for the previously described encoding apparatus 1100, also the CPU 1305 of the decoding apparatus 1300 takes care of activating the proper sequence of operations performed by the units 1310-1330 in the decoding process performed by the apparatus 1300. These units can be implemented by means of dedicated hardware components (e.g., CPLD, FPGA, or the like) or can be implemented through one or more sets of instructions which are executed by the CPU 1110; in the latter case, the units 1310-1330 are just a logical (virtual) units.

When the apparatus 1300 is in an operating condition, the CPU first fetches the coded edge map f' and transform coefficients f^ from the channel or storage media 1200 and loads them into the memory unit 1340. Then, the CPU activates the graph decoding unit 1320, which fetches from the memory the edge map f', executes phases of the method for decompressing images or video streams according to the invention (see FIG. 10), and stores into the memory means 1340 the recovered weights matrix W'. Subsequently, the CPU 1305 activates the graph Laplacian unit 1330, which fetches from the memory 1340 the recovered weights graph W', computes the eigenvectors U, and stores them in the memory means 1340. At this point, the CPU may dispose of the recovered weights matrix W' from the memory because not required anymore at the decoder side. Next, the CPU activates the inverse DFT unit 1360, which fetches from the memory 1140 the eigenvectors U and the transform coefficients f^ and recovers the image f, which it stores in the memory unit 1340. Finally, the CPU may fetch from memory the recovered image f and send it, by means of the video adapter 1370, to the display unit 1400.

It should be noted how the encoding and decoding apparatuses described in the figures may be controlled by the CPU to internally operate in a pipelined fashion, enabling to reduce the overall time required to process each image, i.e., by performing more instructions at the same time (e.g., using more than one CPU and/or CPU core).

It should also be noted than many other operations may be performed on the output data of the coding device 1100 before sending them on the channel or memorizing them on a storage unit, like modulation, channel coding (i.e., error protection). Conversely, the same inverse operations may be performed on the input data of the decoding device 1300 before effectively process them, e.g., demodulation and error correction. Those operations are irrelevant for embodying the present invention and will be therefore omitted.

Besides, the block diagrams shown in FIG. 2 are of exemplificative nature only; they allow to understand how the inventions works and how it can be realized by the person skilled in the art. He/she understands that these charts have non limitative meaning in the sense that functions, interrelations and signals shown therein can be arranged in many equivalents ways; for example operations appearing to be performed by different logical blocks can be performed by any combination of hardware and software resources, being also the same resources for realizing different or all blocks.

The encoding process and the decoding process will now be described in detail.

Encoding

Figure 7:
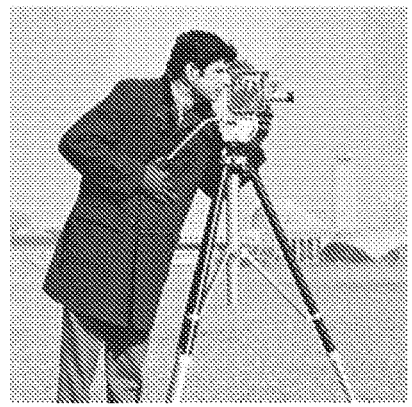
FIG. 7 shows an example of a grayscale image f (FIG. 7(a)), the corresponding edge map f' as generated by a graph coding unit shown FIG. 2 (FIG. 7(b)), and the recovered image f~(FIG. 7(c))
Figure 7:
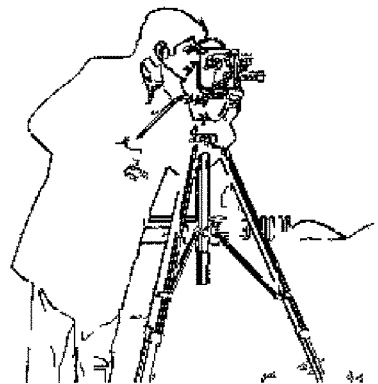
Figure 7:

In order to show how the encoding process occurs, it is assumed that the image f to be processed is preferably a grayscale image where each pixel is encoded over 8 bit so that the value of said pixel can be represented by means of an integer value ranging between 0 and 255 (see the example figure f shown in FIG. 8(a) and FIG. 9(a), wherein the latter shows a 4×4 subset of FIG. 7).

Figure 3:
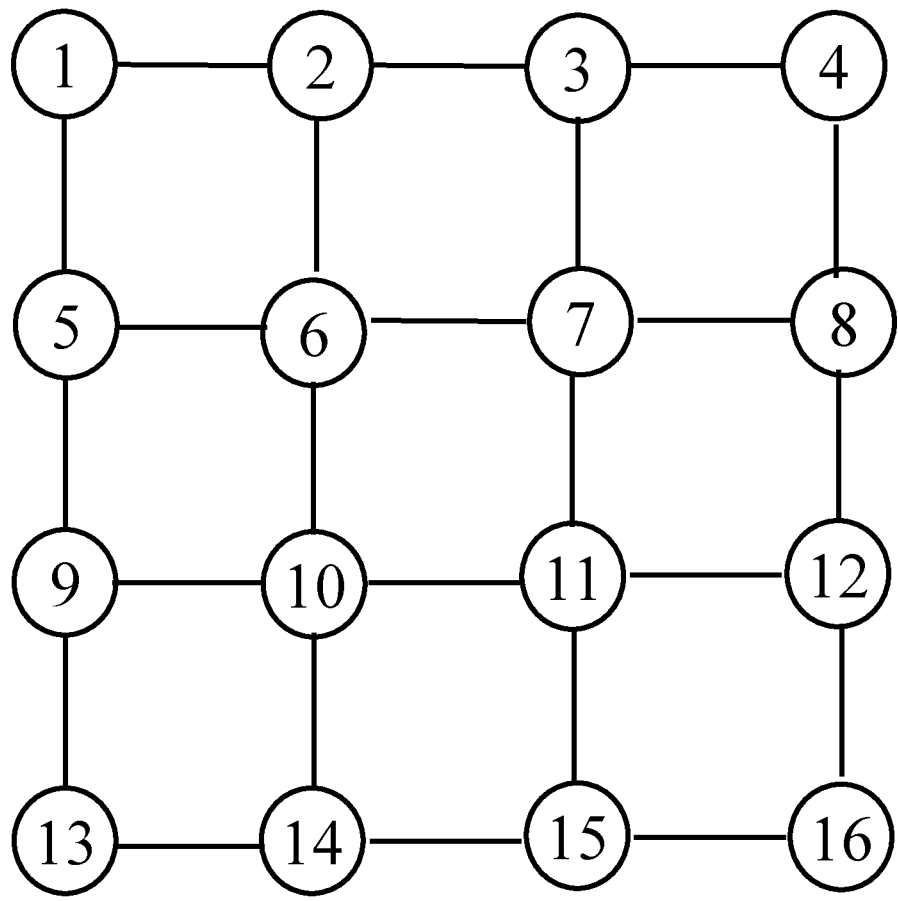
FIG. 3 shows a possible way for vectorizing (serializing) an image or an image block represented as a graph of nodes connected by edges.

With also reference to FIG. 3, the image f is represented by means of an N×1 vector where the i-th element preferably corresponds to the i-th pixel in the image f counted in raster scan order; hence, FIG. 3 shows a possible way of vectorizing the image block representation starting from a bi-dimensional matrix or graph form (FIG. 3(a)), wherein the nodes represent the pixels and the arcs the horizontal and vertical adjacencies, and wherein the block has a square shape and N is assumed to be 16. Each n-th pixel (node) is numbered according to the raster scan order from 1 to 16 and transformed in the n-th element of image vector f (FIG. 3(b)). Therefore, for example, in an embodiment of the invention pixel 6 ($f_6$) is considered adjacent only to pixels 2 ($f_2$), 5 ($f_5$), 7 ($f_7$) and 10 ($f_{10}$), while pixel 13 ($f_{13}$) is adjacent to pixels 9 ($f_9$) and 14 ($f_{14}$).

Figure 4:
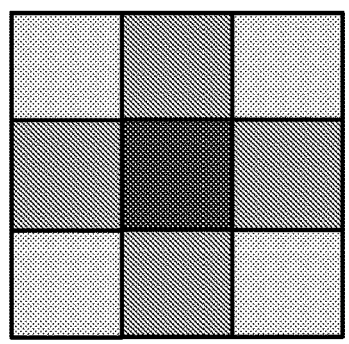
FIG. 4 shows three possible cases of pixel adjacency for a 3×3 pixel image f.
Figure 4:
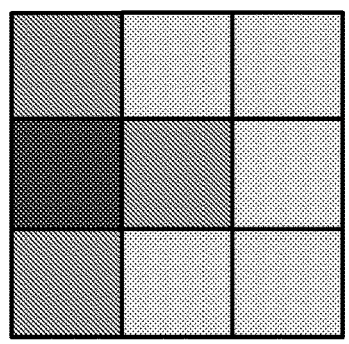
Figure 4:
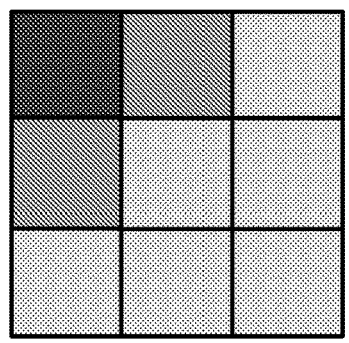

With also reference to FIG. 4, it is now described, in more detail, what is considered adjacent in the preferred embodiment of the invention.

In FIG. 4(a), the reference pixel (black) is located at the center of the image, and has four adjacencies (dark grey pixels) on top, left, bottom and right, whereas in an embodiment of the invention the remaining four pixels (light gray) are preferably not considered adjacencies of the reference pixel. By using this adjacency structure, i.e., a square grid where each pixel is a vertex of the graph and is connected to each of its 4-connected neighbors, it is possible to simplifying advantageously the determination of the eigenvectors, since it has been proved that, when the graph is a 4-connected grid and all the four edges have the same weight, the 2D DCT basis functions are eigenvectors of the graph Laplacian, and thus the transform matrix U can be the 2D DCT matrix. In this way, it is possible to reduce the computation complexity of the execution of the encoding and decoding methods according to the invention, so that the quality of the processed images or video streams can be increased.

In FIG. 4(b), the reference pixel (black) is located on a border of the image and is deemed to have three adjacencies (dark grey pixels) on top, bottom and right; in an embodiment of the invention the remaining five pixels (light gray) are not considered adjacencies of the reference pixel.

In FIG. 4(c), the reference pixel (black) is located at a corner of the image and is deemed to have two adjacencies (dark grey pixels) on bottom and right; in an embodiment of the invention the remaining six pixels (light gray) are not considered adjacencies of the reference pixel.

Figure 5:
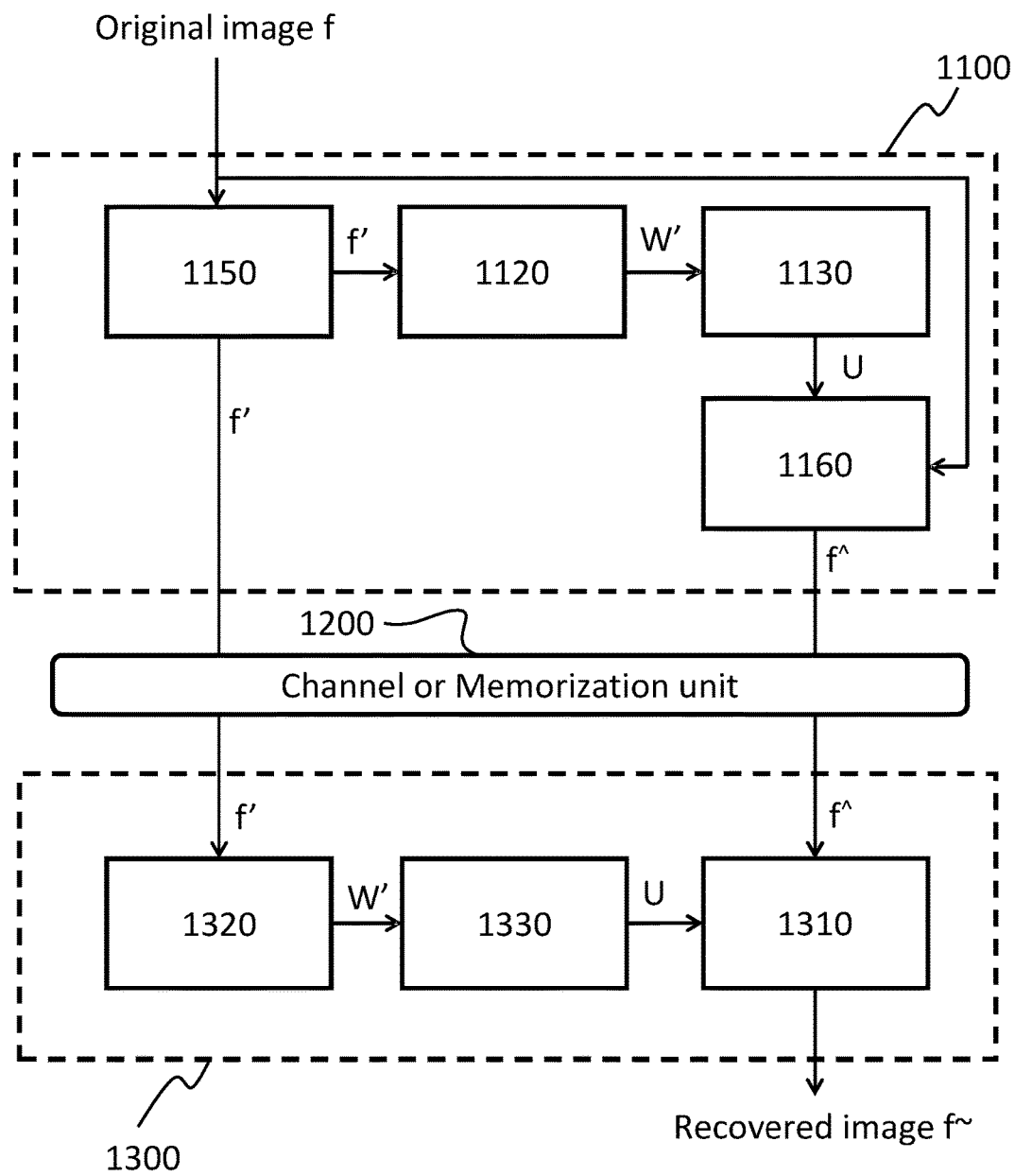
FIG. 5 shows a block diagram of a graph-based image encoding-decoding system according to the present invention.

With also reference to FIG. 5, it is now described how the different parts of the encoding apparatus 1100 interact for compressing digital images or video streams. As already described above, the encoding apparatus 1100 comprises at least the graph coding unit 1150, the graph decoding unit 1120, the graph Laplacian unit 1130, and the graph transform unit 1160.

Figure 6:
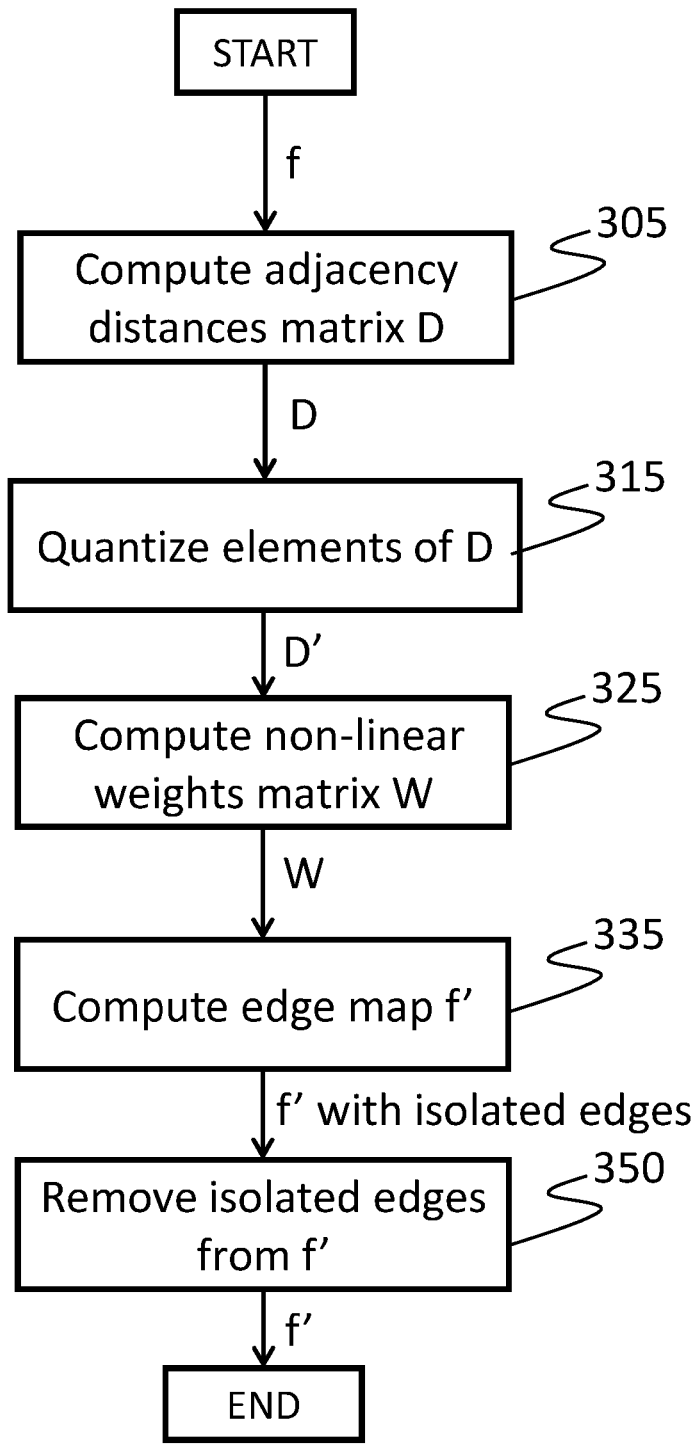
FIG. 6 shows the functioning of the apparatus for encoding digital images or video streams shown in FIG. 2.

With also reference to FIG. 6, the graph coding unit 1150 preferably comprises the following (physical or logical) parts:

a distance computation unit 305 configured for computing the distances between pixels;

a distance quantization unit 315 configured for quantizing, on the basis of quantizing information, the value of the weights of the arcs, which are computed on the basis of the distances between pixels;

a non-linear weighting unit 325 configured for mapping the quantized value of the weights of the arcs from the distances domain to a weights domain;

a edge prediction unit 335 configured for determining an edge map on the basis of the weights of the arcs mapped in the second domain;

an isolated edges removal unit 350 configured for deleting the edges which have no neighbor edge.

The distance computation unit 305 processes image f and produces a matrix of distances D where each element $d_{i,j}$ is the absolute distance in the pixel space between the i-th and j-th node/pixel of the graph/block f, i.e., $d_{i,j}=|f_i-f_j|$. For example, assuming that an image is encoded as an 8-bit grayscale image as depicted in FIG. 7(a), the distance between any pair of pixels will range in the [0, 255] interval. The distances between all pairs ($f_i$, $f_j$) of pixels of f are represented as an N×N matrix that we call distance matrix and indicate as D in the following, where $d_{i,j}$ indicates the distance between pixel $f_i$ and $f_j$ as described above. Because distances are symmetrical (i.e., $d_{i,j}=d_{j,i}$), matrix D will be symmetric. Because the distance between a node and the node itself is 0, the matrix D will have zero values on the diagonal, i.e., $d_{i,j}=0$ for j=i. For the purposes of this invention, we are interested in computing only the distance between the i-th pixel and its top, bottom, right, and left j-th adjacent pixels, if any, to which we refer the following as adjacency; otherwise, we assume that all other distances are represented as to be infinite. As already described above, FIGS. 4(a)-(c) show the different possible adjacencies of a pixel depending on its position within the image. More in details, both the zero values of the diagonal of the matrix D and the infinite values between unconnected nodes can be neglected in the computations since they are of no significance for the purposes of the invention. These distance value are named as "don't care values".

The distance quantization unit 315 processes the distance matrix D and produces in output a N×N quantized distance matrix D'. The quantization unit enables to reduce the number of bits required to represent each element of the distance matrix, which is a pivotal step in obtaining a bandwidth efficient representation of image f, so that it is possible to increase the quality of the digital images or video streams processed.

Each element of the corresponding distance matrix D (that is not "don't care") requires up to 8 bits to be represented: the goal of the quantization unit is to reduce the space required for this representation. The experimental evidence showed that the distribution of the distances $d_{i,j}$ follows a Laplacian distribution, thus they should to be quantized via an appropriate quantizer. The applicant discovered that unexpected compression results can be achieved by means of a quantizer having uniform thresholds and an overload region.

The number of desired output bits drives the tradeoff between rate and quality of the quantized distance matrix D'. Our experimental evidence suggest that one bit, i.e., two possible output values, are enough to achieve a compact yet informative representation of the distance matrix D'. Therefore, in the following we consider a quantization where $d'_{i,j}$ can be represented over just two levels, i.e., just one bit; hence, the quantized distances $d'_{i,j}$ can assume either a "low" or a "high" value, which are respectively identified by symbols 'd' and 'D', wherein both d and D are positive real numbers and D>d.

About the overload threshold parameter, our experiments revealed that the overall efficiency of the encoder-decoder chain is largely uncorrelated to such parameter: in the following, we assume that such parameter lies somewhere in the 20~30 range. The output of the quantizer is the N×N matrix of quantized distances D', where each distance $d'_{i,j}$ is either equal to the "d" or the "D" symbols, and a table that map each output symbol ("d" and "D", in our case) to its actual value in the domain of the real numbers. When $d'_{i,j}$=d (i.e., "low" value), it means that the two adjacent pixels $f_i$ and $f_j$ are similar and there are no (sharp) discontinuities between them. Otherwise, when $d'_{i,j}$=D (i.e., "high" value) it means that the two adjacent pixels $f_i$ and $f_j$ are dissimilar and there may be a discontinuity (e.g., the boundary between two objects in the image) between them.

Summarizing, the processing means 1110 are preferably configured for computing the edge map f' by mapping each element of the weight map to only two possible symbols on the basis of the quantizing information, wherein said quantizing information comprises a threshold value and two values associated to said two symbols, respectively.

The actual value associated to the quantizer output symbols are estimated by the quantizer as those which minimize the square reconstruction error between the input and output of the quantizer, i.e., between the weight map W and the quantized differences.

It is noted that the graph structure is not altered during the quantization, i.e., it never happens that two nodes becomes disconnected by setting the weight of the arc connecting the two pixels to "don't care"). In this way, it is possible to recover a high quality weights graph at the receiver side.

Concluding, the quantization unit 315 produces in output an N×N matrix of quantized arcs weights where those elements, which are not encoded as "don't care", are encoded on one bit each.

The non-linear weighting unit 325 takes in input the matrix of quantized distances D' and generates an N×N matrix of distances W weighted according to some inverse and non-linear function. The weight of the arc connecting two nodes of a graph is conceptually the inverse of the distance between two nodes. Therefore, the weighting function has necessarily to be of the inverting type, so as to map low distances to high weights and high distances to low weights. Relatively to our considered graph application, i.e., representing whether two pixels belong to the same smooth region or not, it is desirable that the weighting function is also non-linear.

Non-linear functions have in fact the desirable property of polarizing the input towards the lower and higher ends of the considered dynamic range, i.e., they tend to better highlight whether two pixels belong to the same smooth region or not. Several functions can be used for determining the arcs weights, among which the Gaussian function (L. J. Grady and J. R. Polimeni, "*Discrete calculus: Applied analysis on graphs for computational science*", Springer, 2010) which is defined as follows $$w_{i,j} = \exp\left(-\frac{{d'_{i,j}}^2}{s^2}\right)$$

and the Cauchy function, which is defined as follows $$w_{i,j} = \frac{1}{1 + \left(\frac{d'_{i,j}}{\alpha}\right)^2}$$

Both functions boast the required properties of inverse relationship and non-linearity. However, according to our experiments, the Cauchy functions yields best results for compacting the image energy. Notice that the Cauchy function requires in input the alpha parameter: we set such parameter to be equal to standard deviation of the elements in the D' matrix.

The resulting weights matrix W is such that each significant element can be equal to either a "low" value that we indicate as m, and some "high" value that we indicate as M, i.e., $w_{i,j}$=m or $w_{i,j}$=M. When $w_{i,j}$=M, it means that the two adjacent nodes/pixels $f_i$ and $f_j$ are similar and there are no (sharp) discontinuities between them, i.e., they belong to the same smooth region. Otherwise, when $w_{i,j}$=m, it means that the two adjacent nodes/pixels $f_i$ and $f_j$ are not similar and there may be a discontinuity between them, i.e., they do not belong to the same smooth region.

Figure 8:
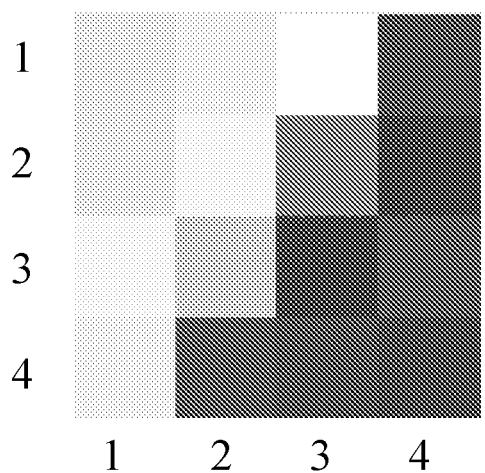
FIGS. 8 and 9 show an exemplary image block (FIGS. 8(a) and 9(a)) and the relevant weights matrix W as internally produced by unit 1150 in FIG. 5 that is depicted both in graphical (FIG. 8(b)) and text (FIG. 9(b)) form.
Figure 8:
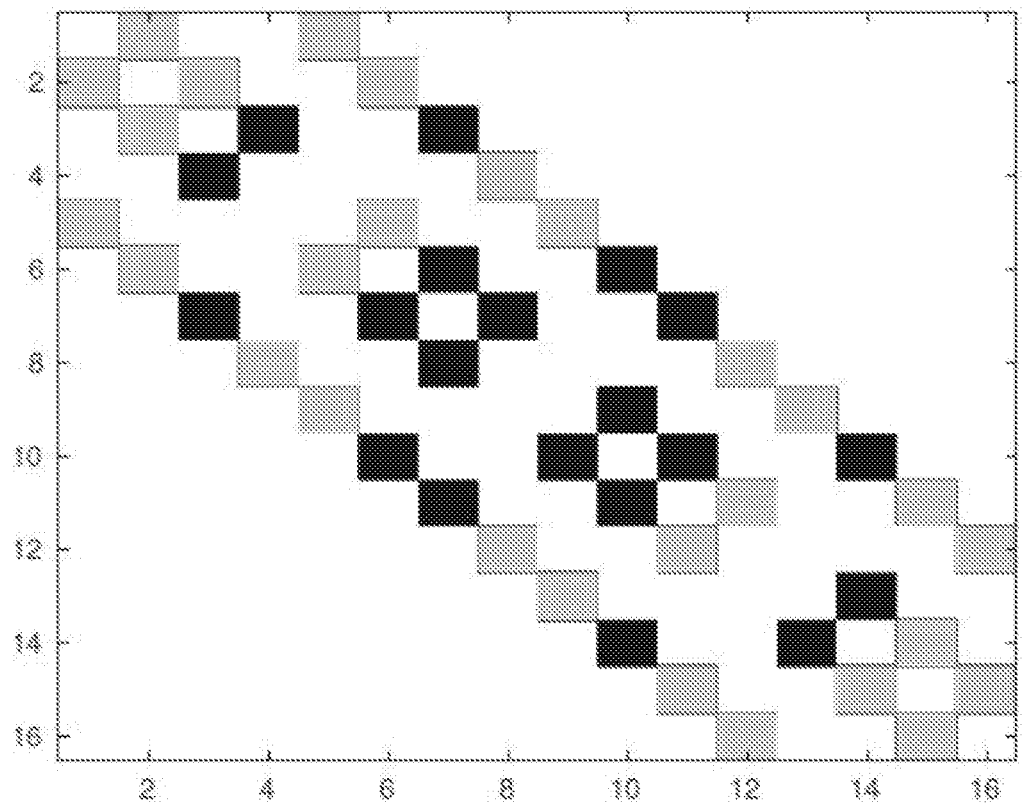
Figure 9:
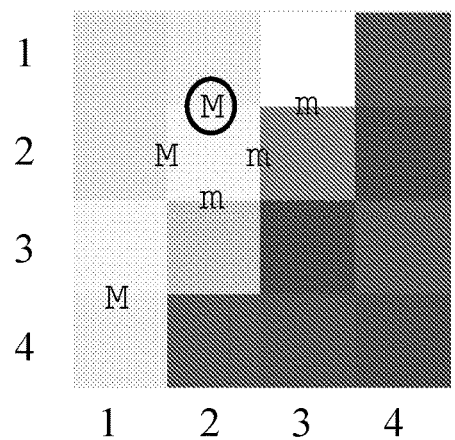

With also reference to FIGS. 8 and 9, the FIGS. 8(a) and 9(a) show the same 4×4 pixel block belonging to the original image in FIG. 7(a), whereas the FIGS. 8(b) and 9(b) show the corresponding 16×16 weights matrix W. The block in FIGS. 8(a) and 9(a) is crossed by a diagonal discontinuity which goes from the bottom-left corner to the top-right corner. The corresponding weights matrix in FIG. 9(b) is such that the don't care elements "–" correspond to disconnected nodes, "m" elements represent "low" arc weights (i.e., dissimilar pixels) and "M" elements represent "high" weights (i.e., "similar" pixels).

FIG. 8(b) shows an example of the 16×16 weights matrix W produced internally by unit 325 on the basis of to the 4×4 image block given as input to unit 305. The arcs connecting dissimilar pixels bear a "low" m weight, whereas the arcs connecting similar pixels bear a "high" M weight. For example, $f_{13}$ and $f_{14}$ in FIG. 8(a) are separated by a diagonal discontinuity: the result is that the corresponding weight $w_{13,14}$ is set to the m values. Conversely, for example, $f_1$ and $f_2$ belong to the same smooth region, and are not crossed by any discontinuity, thus the corresponding arc weight $w_{1,2}$ is set to the M weight. It should be noted that each row or column of the W matrix has at most 4 elements different from null, since only the arcs corresponding to the top, left, bottom and right adjacency of a pixel of the original image block may bear a weight.

It must be noted that the functions mentioned as examples for deriving a weights matrix from the distance matrix establishes a tight and biunique association between the values of the former and those of the latter. Therefore, any information derivable from one of the two matrixes can be derived, mutatis mutandis, from the other just taking into account the modifications introduced by the function employed in the transformation, i.e., high distances are converted to low weights, and so on. In particular, the edge map of the invention can be derived either directly from the distance matrix or from the weights matrix; in the present description just for the sake of simplicity only the second case is detailed.

The edge prediction unit 335 takes in input the N×N weights matrix W and produces a N×1 binary edge map of image f that is named as f' in the following. The edge map f' is such that each pixel is labelled either as edge ("b" label for "black" in the following) or non-edge ("w" label for "white" in the following); in this way, it is possible to exploit the spatial prediction between adjacent pixels. In the following description, the i-th pixel of f' is indicated as $f'_i$.

The method for computing the edge map f' starting from the weights matrix W is described below.

First, the unit checks into matrix W if the arc that connects the pixel/node $f_i$ to its bottom adjacency is equal to m, i.e., the unit checks whether $w_{i,j}$=m. Second, the unit checks into matrix W if the arc that connects pixel/node $f_i$ to its right adjacency $f_j$ is equal to m, i.e., the unit checks whether $w_{i,j}$=m, where j is such that $w_{i,j}$ is the weight of the arc connecting $f_i$ to its right adjacency $f_j$. If at least one of the two checks is successful, the unit labels $f'_i$ so as to indicate that it is an edge pixel, i.e., $f'_i$=b; otherwise, the unit labels $f'_i$ so as to indicate that it is an non-edge pixel, i.e., $f'_i$=w.

The isolated edges removal unit 350 deletes the edge pixels present in the edge map f' which have no neighbour edge pixels to produce a smoother binary image which is hence simpler to compress, so that the apparatus can process digital images and/or video streams having higher quality. Namely, for each $f'_i$ pixel in the edge map f', the edge removal unit 350 counts how many neighbor pixels are of the edge type. We recall that if we consider neighbors the closest horizontal, vertical and diagonal pixels, each pixel in an image has three neighbors if located at one of the four corners of an image, five neighbors if located on one of the four borders of the image outside the corners, and eight neighbors for the remaining cases. Therefore, the unit counts how many edge neighbors a pixel $f'_i$ has in the map: if this count is inferior to some threshold t value, then $f'_i$ is set to a non-edge value. The Applicant experiments show that the optimal threshold t depends on the actual size of the block of image considered for the compression: smaller blocks require lower thresholds. For example, our experiments showed that for a block of 32×32 pixels, a reasonable threshold for isolated pixel removal is equal to t=10 pixels. In the present description the terms "adjacent" and "neighbour" elements are synonyms, while what is considered adjacent or not in a certain calculation is expressly specified in each context.

Figure 10:
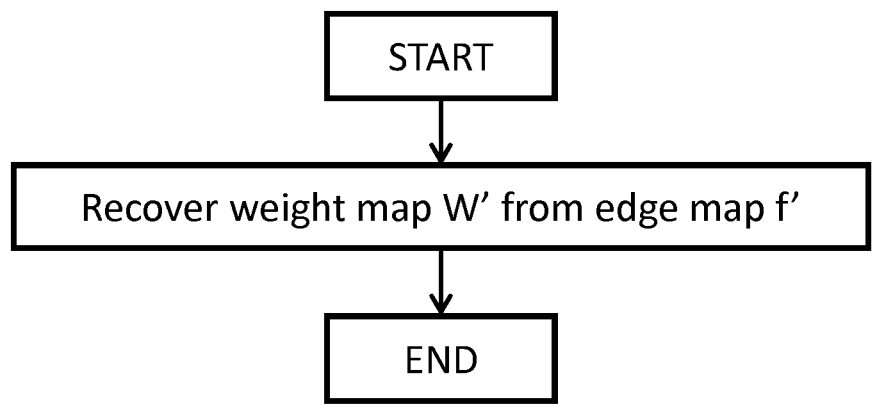
FIG. 10 shows the functioning of the apparatus for decoding digital images or video streams shown in FIG. 2.
Figure 12A:
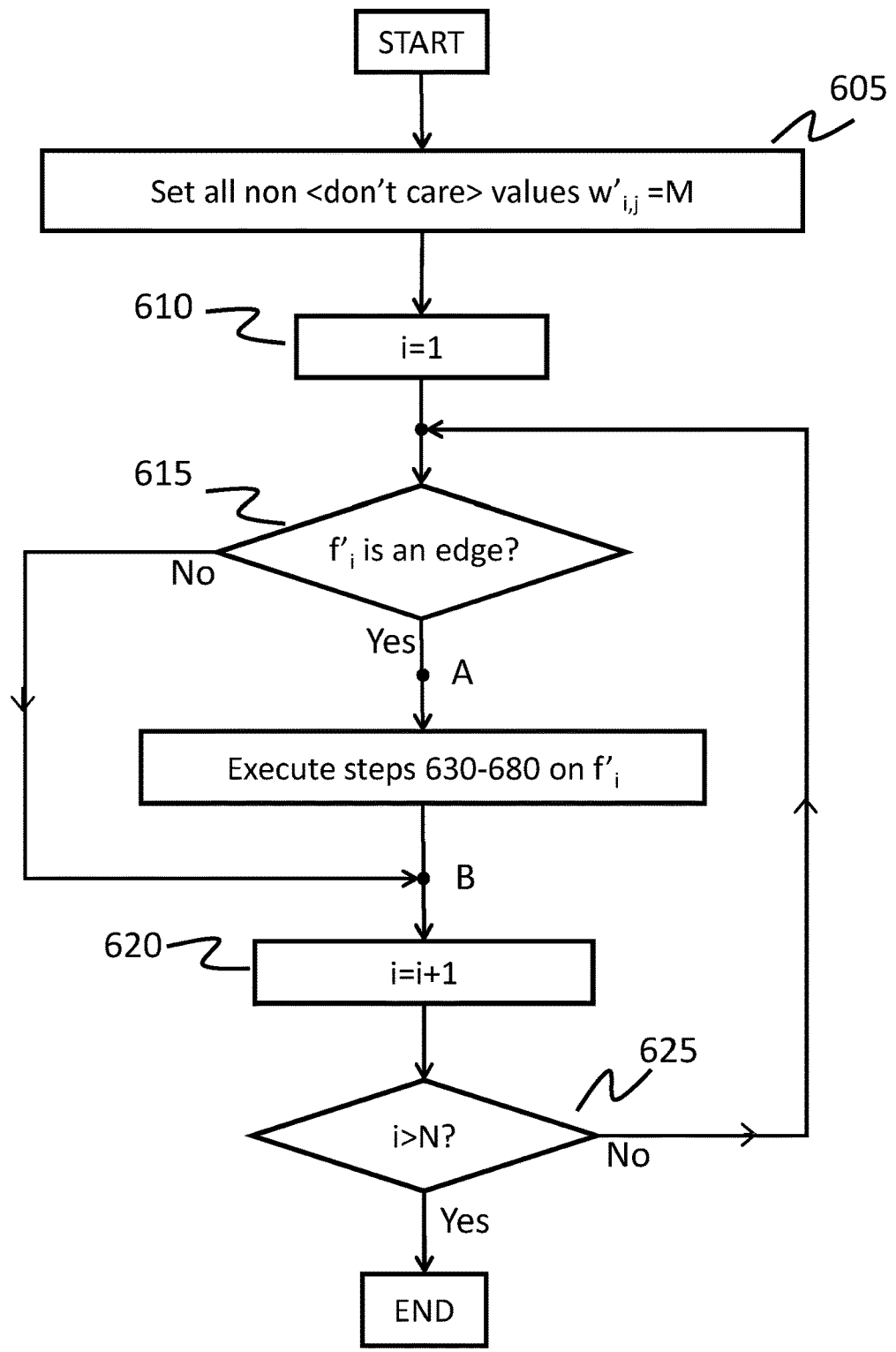
FIGS. 12a and 12b show a flow chart illustrating the computation steps executed by the graph decoding units 1120, 1320 shown in FIG. 2 for recovering the weights matrix W' from the edge map f'.
Figure 12B:
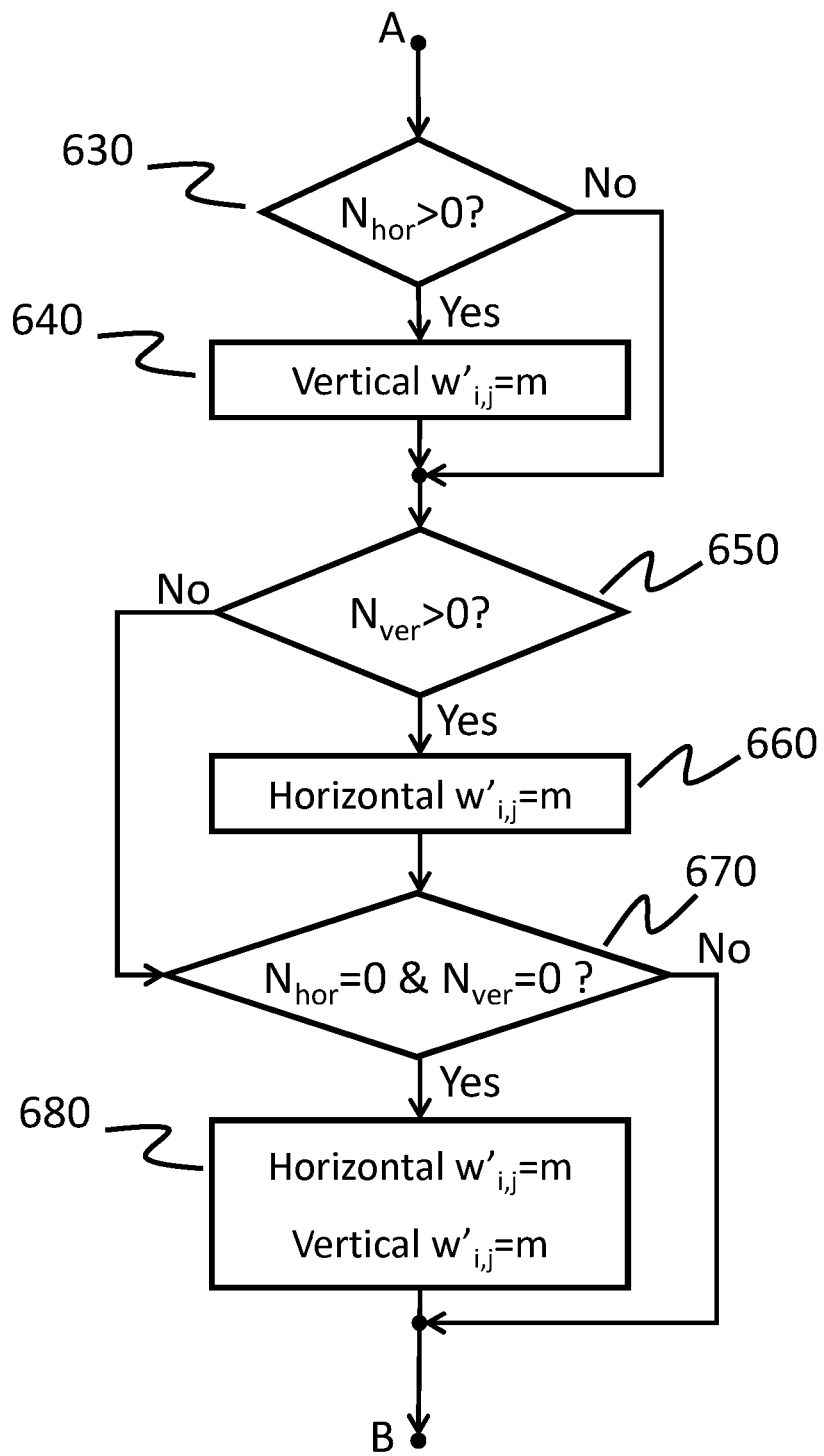

With also reference to FIGS. 10 and 12a, 12b, the graph decoding unit 1120 of the encoding apparatus 1100 takes as input the N×1 binary edge map f' and produces as output the N×N reconstructed weights matrix W'.

All the computation steps shown in FIGS. 12a, 12b are executed for every element of f', except the initialization step 610, which is performed once and refers to the whole reconstructed (or "predicted") weight matrix W'.

Typically, in case of only two possible arc weights, the vast majority of the arcs in the weights matrix W will have the "high" arc weight, meaning that the two pixels that it connects are similar; instead only a small number of arcs will have the "low" arc weight, indicating that there is a discontinuity between the two pixel connected by the arc.

Figure 11:
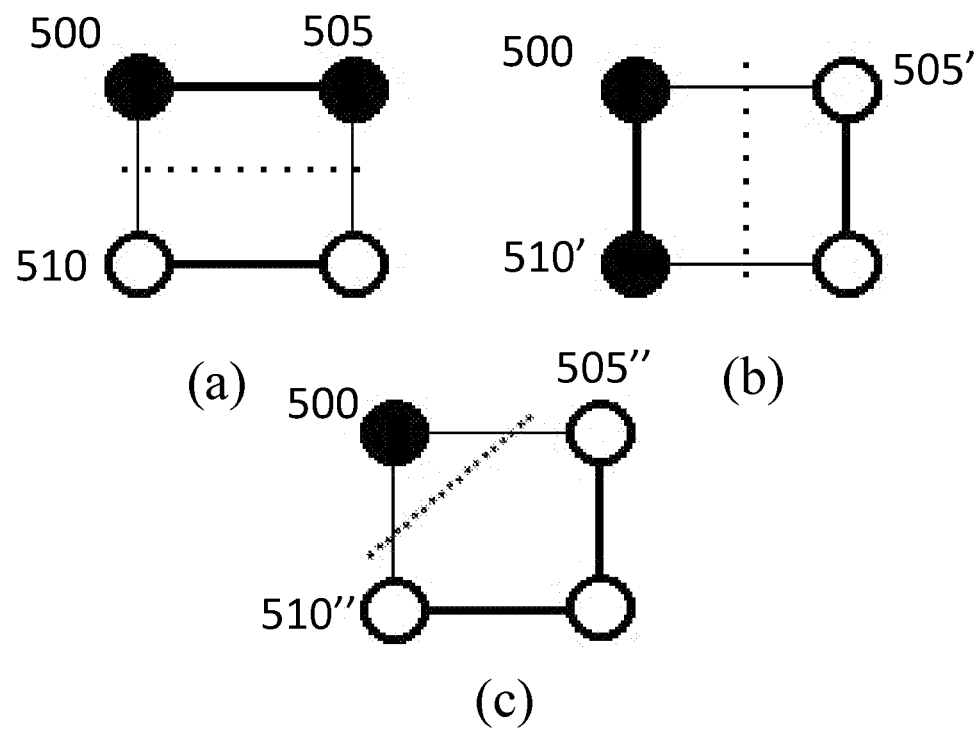
FIG. 11 shows schematically the prediction-based method graph for constructing the edge map according to the present invention.

With also reference to FIG. 11, the method for constructing the prediction based graph is shown schematically. Each node represents one pixel of the image and the nodes represent the binary (black or white) edge map pixel received the decoder: the black dots are the edge pixels, the white ones the non-edge pixels. The graph representing the image is scanned in raster-scan order and a vector of N white/black nodes is received by the graph decoding unit 1120. The graph decoding unit 1120 recovers the original matrix of graph weights by predicting the discontinuities on the basis of the transmitted edge/non-edge values. The dotted lines represent the reconstructed image discontinuities at the graph decoding unit 1120. The arc weights in matrix W are set in accordance with the discontinuities; the ones with a thicker line have the higher weight, the ones with a thinner line have the lower weight.

With particular reference to FIG. 11(a), if the current i-th pixel $f_i$ 500 is an edge pixel like the right adjacent one 505 while the bottom adjacent pixel 510 is not, then a horizontal discontinuity is predicted to exist between the pixels 500 and 510 as represented by the dotted line. Conversely, with reference to FIG. 11(b), if the current i-th pixel $f_i$ 500 is an edge pixel and if the bottom adjacent pixel 510' is an edge pixel like pixel 505 while the right adjacent pixel 505' is not, then a vertical discontinuity is predicted to exist between pixels 500 and 505' as represented by the dotted line. Finally, with reference to FIG. 11(c), if the current i-th pixel f_i 500 is an edge pixel but neither the bottom adjacent pixel 510" nor the right adjacent pixel 505" are edge pixels like pixel 505, then a diagonal discontinuity is predicted to exist between pixel 500 and pixels 505" and 510" as represented by the dotted line.

The graph decoding unit 1120 independently processes every i-th pixel of the N-pixels edge map $f'_i$ in raster scan order and recovers the N×N-nodes weights graph W'. It is recalled that each element of W' that is non-null will either assume a "high" value M, i.e., $w'_{i,j}$=M, or a "low" value m, i.e., $w'_{i,j}$=m, depending on the particular edge map f'. It is also recalled that when $w'_{i,j}$=M, it means that pixels $f_i$ and $f_j$ in the original image f belong to the same smooth region, i.e., they are not separated by any discontinuity. Conversely, when $w'_{i,j}$=m, then the pixels $f_i$ and $f_j$ of the original image f belong to two different regions, i.e., they are separated by a discontinuity. The graph coding unit 1150 will also convey to the graph decoding unit 1120 the actual values of the "low" m and "high" M weights $w'_{i,j}$=m, for example as a side information to the edge map f', so that the decoding unit 1120 is able to correctly restore W'.

We recall that the recovered weight matrix W', as well as the original weights matrix W, is sparse, since weights are defined only for the 2, 3 or 4 adjacent pixels (see FIG. 14); the undefined weights of the matrix can be set to 0 except for each pixel above, below, at the right and at the left of each pixel, if any, relying on the diagonal of the matrix.

With also reference to FIGS. 12a, 12b, the graph decoding unit 1120, as a preliminary initialization step, sets to the "high" value, i.e., it sets $w'_{i,j}$=M, all those elements of W' that are not equal to "don't care" by definition (step 605).

First, for each $f'_i$ pixel starting from i=1 (step 610), the unit checks whether it is labelled as an "edge" pixel (step 615). If that is not the case, the pixel counter is incremented (step 620) and the next element of the edge map is processed. Otherwise, the graph decoding unit counts how many horizontal neighbours (called $N_{hor}$ at step 630) of $f'_i$ are labelled as edges: if such count is greater than 0, then the arc weight in W' representing the connection between $f'_i$ and its bottom adjacency $f'_j$(named Vertical $w'_{i,j}$) is set to the "low" value, i.e., $w'_{i,j}=m$ (step 640). This is for example the case of the f' depicted in FIG. 11(*a*), where the edge pixel 500 has an edge adjacency in pixel 505 and is separated by a horizontal discontinuity from the non-edge pixel 510.

Second, the unit counts how many vertical adjacencies of f'$_i$ (called $N_{ver}$ at step 650) are labelled as edges: if such count is greater than 0, then the arc weight connecting $f_i$ to its right adjacency $f_j$ (named Horizontal $w'_{i,j}$) is set to the "low" value, i.e., $w'_{i,j}=m$ (step 660). This is for example the case of the f' depicted in FIG. 11(*b*), where the edge pixel 500 has an edge adjacency in pixel 510' and is separated by a vertical discontinuity from the non-edge pixel 505'.

Finally, if both the number of horizontal and vertical adjacencies of the i-th pixel of f' f'$_i$ are equal to 0 (step 670), then both the arc weights $w'_{i,j}$ connecting $f_i$ to its right and bottom adjacencies $f_j$ respectively are set to the "low" value, i.e., $w'_{i,j}=m$ for both the relevant adjacencies (step 680). This is the case occurring in the edge map f' depicted in FIG. 11(*c*), where the edge pixel 500 has no edge adjacency, and is separated by a diagonal discontinuity from the non-edge pixels 505" and 510". The counter i is incremented at each iteration at step 620; when it becomes greater than the elements number of f', supposed to be N, (verification of step 625) the reconstruction procedure of W' ends.

Because of the way f' was originally computed from the original weights matrix W, it turns out that W' is a close approximation of W, which eventually enables the reconstruction of a close approximation of the original f by the receiver as detailed later on.

The graph Laplacian unit 1130 of the encoder apparatus 1100 takes as input the weights matrix W' and generates the N×N transform matrix U.

First, the unit computes the N×N diagonal matrix E from W' such that the i-th element of its diagonal is equal to the sum of all the weights of all the arcs incident into the i-th pixel as described in W'.

Second, the unit computes the N×N matrix L=E−W', where L is the graph-Laplacian of W'.

Finally, the unit computes the N×N matrix U known as transform matrix, where the rows of U are the eigenvectors of L, i.e., the rows of U are the transposed vectors that allow to diagonalize L.

The graph transform unit 1160 of the encoding apparatus 1100 takes as input the original image f and the transform matrix U, and computes the N×1 coefficients vector f̂ via the matrix multiplication $$f̂=U·f.$$

The output of the encoder is hence principally composed of the edge map f' and the coefficient vector f̂, which are delivered to the decoder together with the table which specifies the actual "m" and "M" numerical values to be recovered into the weights matrix W', for example, over a channel or a storage unit 1200 as illustrated in FIGS. 2 and 5.

As already described above, FIG. 9 shows a 4×4 pixel block (FIG. 9(*a*)) belonging to the original image in FIG. 7(*a*) and the corresponding 16×16 weights matrix W (FIG. 9(*b*)); the block in FIG. 9(*a*) is crossed by a diagonal discontinuity which goes from the bottom-left corner to the top-right corner. The corresponding weights matrix in FIG. 9(*b*) is such that the don't care elements "−" correspond to disconnected nodes, "m" elements represent "low" arc weights (i.e., dissimilar pixels), and "M" elements represent "high" weights (i.e., "similar" pixels).

For example $f_2$ (pixel $f_{1,2}$ of the image block, i.e., the pixel located in the first row and second column of the image block) has a low distance in the gray scale space with $f_6$ (pixel $f_{2,2}$ of the block); thus the $w_{2,6}$ element of the W matrix is set to the high value "M", see circled values in FIG. 9(*b*); of course also the symmetrical value $w_{6,2}$ assumes the same value M.

Figure 13:
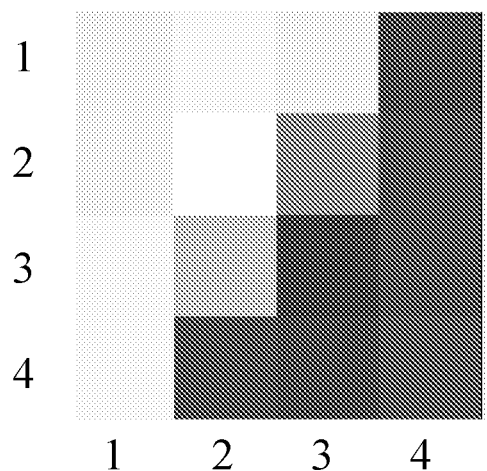
FIGS. 13 and 14 show the image block (FIGS. 13(a) and 14(a)) and the corresponding exemplary 16×16 weights matrix W' that is depicted both in graphical (FIG. 13(b)) and text (FIG. 14(b)) form as recovered by graph decoding units 1120, 1320.
Figure 13:
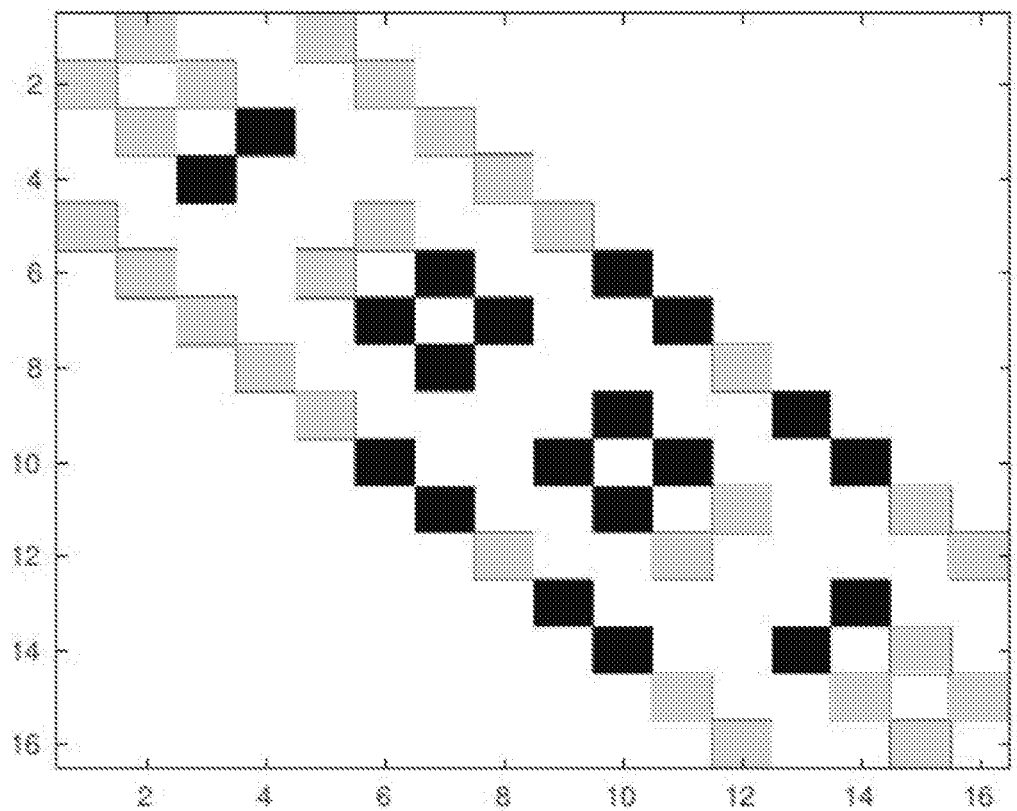
Figure 14:
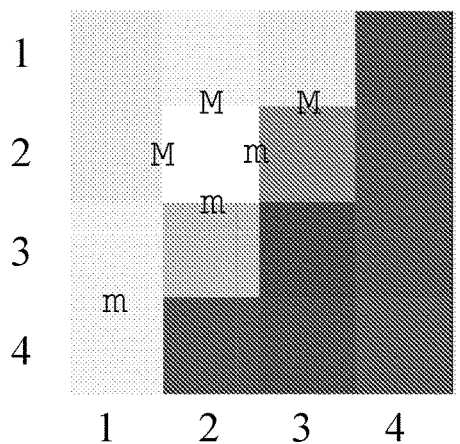

With reference to FIGS. 13 and 14, FIGS. 13(*a*) and 14(*a*) show a 4×4 pixel block corresponding to a 16×16 reconstructed (or "predicted") weights matrix W' recovered by the graph decoding unit, either at the encoding apparatus 1100 or at the decoding device 1300. The reconstructed weights matrix W' in FIG. 13(*b*) is recovered by the graph decoding unit 1120 on the basis of the edge map f'; a comparison with the original weights matrix W in FIG. 8(*b*) shows the reconstruction errors due to the encoding of the weights matrix W into the edge map f' performed by the graph coding unit 1150. For example, FIG. 13(*b*) shows $w'_{3,7}=m$, while FIG. 8(*b*) shows $w_{3,7}=M$, so that the weight of the arc between $f_3$ (pixel $f_{1,3}$ of the image block) and $f_7$ (pixel $f_{2,3}$ of the image block) has changed from (correct) "high" (M) to (wrong) "low" (m). As already mentioned above, the reconstructed block in FIG. 13(*a*) is also the output of the decoding apparatus 1300 and a comparison with the original block in FIG. 8(*a*) shows the artifacts due to the encoding. However, it should be noted how the discontinuity crossing the block is preserved by the proposed compression method.

Summarizing, the method for encoding digital images or video streams according to the invention comprises the following phases:

- a receiving phase, wherein at least a portion of an image f is received by means of the input means 1170;
- a weight-map computation phase, wherein a weight map W is locally determined by the unit 1150 by computing, through the processing means 1110, the difference values between the value of each pixel of said portion of the image f and each value of the other pixels of the same portion;
- an edge-map computation phase, wherein an edge map f' is computed, through the processing means 1110, 1120, by quantizing the pixel differences values, which are used for determining the weight map W, on the basis of quantizing information, wherein the edge map f' is composed by elements f'$_i$ indicating whether a corresponding pixel of said at least a portion of an image is an edge or not, wherein each of said elements is labelled as edge "b" or non-edge "w" on the basis of the quantized pixel difference values associated to the image pixel corresponding to said element and to at least one image pixel adjacent to said image pixel corresponding to said element;
- a weights map recovery phase, wherein the edge map f' is processed, by the processing means 1120, so to determine an approximated (reconstructed) recovered weights map W';
- a graph transform matrix computation phase, wherein a graph transform matrix U is determined, by means of the processing means 1110, on the basis of said reconstructed weight map W', e.g., the eigenvectors of the recovered weights map W' (i.e., the transform matrix U) are determined by means of the processing means 1110 (in this case, this phase may be also referred as 'eigenvectors computation phase');
- a transform coefficients computation phase, wherein transform coefficients f̂ are determined, by means of the processing means 1110, on the basis of said graph transform matrix U (e.g., the eigenvectors of the recovered weights map W') and said portion of the image f.

Finally, the edge map (f') and the transform coefficients can be transmitted and/or stored by means of the output means 1180.

Decoding

With reference to FIG. 5, the decoder 1300 comprises the graph decoding unit 1320, the graph Laplacian unit 1330, and the inverse graph transform unit 1330.

The graph decoding unit 1320 of the decoder apparatus 1300 is analogous to the graph decoding unit 1120 of the decoding apparatus 1100. We recall that the unit takes in input the edge map f' and outputs a N×N reconstructed approximated weights matrix W'.

The graph Laplacian unit 1330 of the decoding apparatus 1300 is analogous to the graph Laplacian unit 1130 of the encoding apparatus 1100, takes as input the weights matrix W', and produces as output the N×N transform matrix U.

First, the unit computes the N×N diagonal matrix E from W' such that the i-th element of its diagonal is equal to the sum of all the weights of all the arcs incident into the i-th pixel as described in W'. Second, the unit computes the N×N matrix L=E−W'.

Finally, the inverse graph transform unit 1310 takes as input the transform matrix U and the coefficients vector f^ and recovers (an approximate reconstruction of) the original N×1 image f that we denote as f~. First, the unit transposes matrix U generating the N×N matrix $U^T$. Then, the unit recovers the original image f via the matrix multiplication $$f\textasciitilde=U^T \cdot f\hat{}.$$

FIG. 7(c) shows an example of the recovered image f~: a comparison with FIG. 7(a) shows the reconstruction artifacts resulting from the compression and decompression of the original image.

Summarizing, the method for decoding digital images or video streams according to the invention comprises the following phases:

- receiving phase, wherein the transform coefficients f^ and the edge map f' are received by means of the input means 1380;
- weight-map reconstruction phase, wherein the (reconstructed) weight map W' is determined, by means of the processing means 1320, on the basis of said edge map f';
- an inverse graph transform matrix computation phase, wherein an inverse graph transform matrix $U^{-1}$ is determined on the basis of said reconstructed weight map (W') by means of the processing means 1320, e.g., the eigenvectors (i.e., the transform matrix U) of said reconstructed weight map W' are determined by means of the processing means 1320 (in this case, this phase may be also referred as 'eigenvectors computation phase');
- an image reconstruction phase, wherein at least a reconstructed image f~ is determined, by means of the processing means 1310, on the basis of the transform coefficients f^ and said inverse graph transform matrix $U^{-1}$ (e.g., the eigenvectors of the recovered weights map W).

Finally, the reconstructed image f~ can be outputted by means of output video means 1370.

Performance Tests

Figure 15:
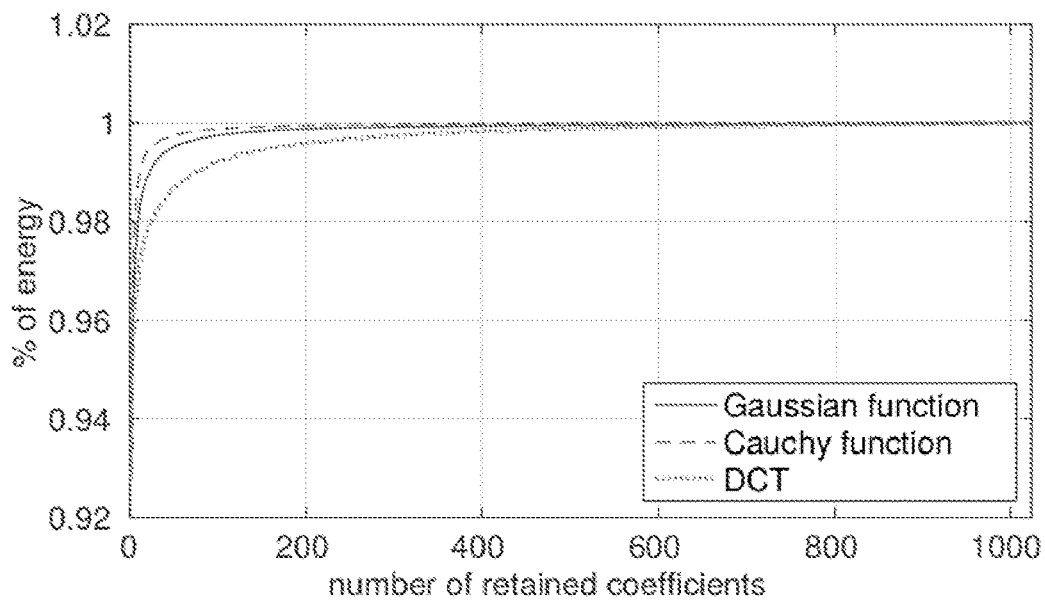
FIG. 15 shows the performance of a test encoder-decoder pair implemented according to the present invention.
Figure 15:
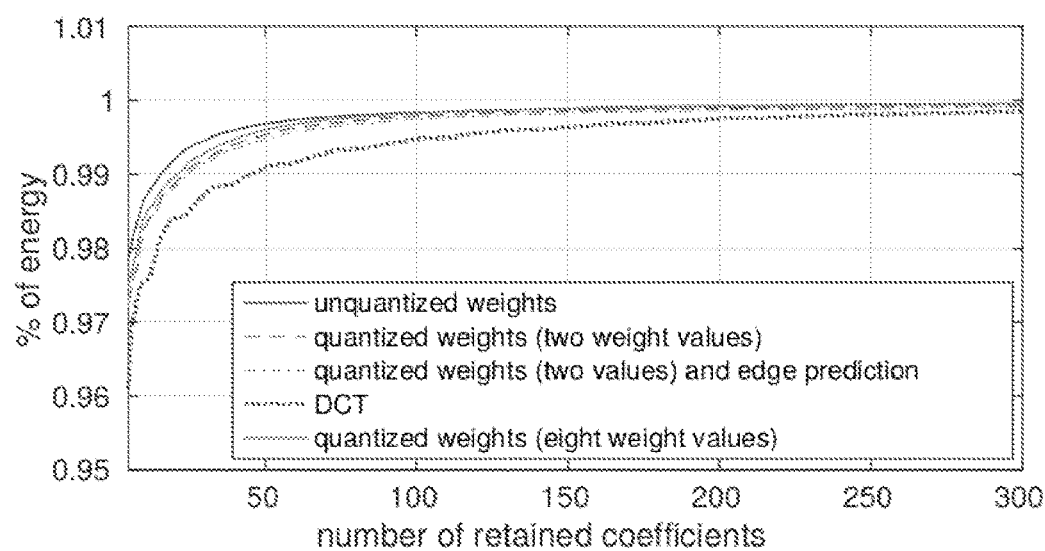

With reference to FIG. 15, the results of performance tests conducted by the Applicant are going to be discussed. In this test, an encoder-decoder pair implemented according to the present invention has been evaluated.

In particular, FIG. 15(a) shows the performance of the graph transform as a function of the weighting functions (i.e., the Gaussian and the Cauchy functions) employed in the nonlinear weighting unit 325. Namely, the figure shows the energy percentage retained in the first n elements of the coefficients vector f^. Steeper curves indicate better ability to compact the information into a lower number of bits, hence better compression properties. The figure shows that the Cauchy function compacts the same amount of energy in a lower number of coefficients, meaning that is has better compression performance than the Gaussian function for the purposes of the present invention.

FIG. 15(b) shows the performance of the graph transform as a function of the number of quantization bins used in the distance quantization unit 315. As per FIG. 15(a), FIG. 15(b) shows the percentage of energy retained in the first n elements of the coefficients vector f^. The unquantized weights curve represents the upper bound to the performance of the proposed invention and corresponds to an ideal case where the W* matrix is transmitted to the decoder as shown in the reference architecture illustrated in FIG. 1, where each element of the matrix is represented on a float type which requires 32 bits (4 bytes) for its representation.

The quantized weights (eight values) and the quantized weights (two values) represent the performance of architecture illustrated in FIGS. 2 and 5 and proposed in the present invention when the distance quantization unit 315 quantizes each $w_{i,j}$ on 3 and 1 bit respectively. In this configuration, the quantized weights are processed using the non-linear Cauchy function by the non-linear weighting unit 325 but the W matrix does not undergo any form of compression via prediction, i.e., the encoding apparatus 1100 transmits or conveys to the decoding apparatus 1300 the W matrix as generated by unit 325. The comparison of these two curves with the unquantized weights curve enables to assess the performance loss due to the sole quantization of the weighs matrix. It is possible to see that the performance loss in terms of the ability to compact energy is minimal, when each element of the W matrix is represented using just 1 bit rather than the 32 bits of the unquantized weights curve, i.e., with a reduction in the W representation rate in excess of 90%.

Finally, the "quantized weights (two values) and edge prediction" curve improves over the quantized weights (two values) curve by adding the arcs weights prediction and corresponds to the actual encoder-decoder architecture proposed by the present invention as illustrated in FIGS. 2,5 and as described in detail in FIG. 6 and FIG. 10 for the encoding and decoding parts, respectively. This comparison shows that the considered curve is very close to the other curves, and in particular it almost overlaps with the quantized weights (two values) curve despite the edge prediction method proposed in this invention reduces the number of bits necessary to convey the arc weights matrix W from $O(N^2)$ to $O(N)$.

Figure 1:
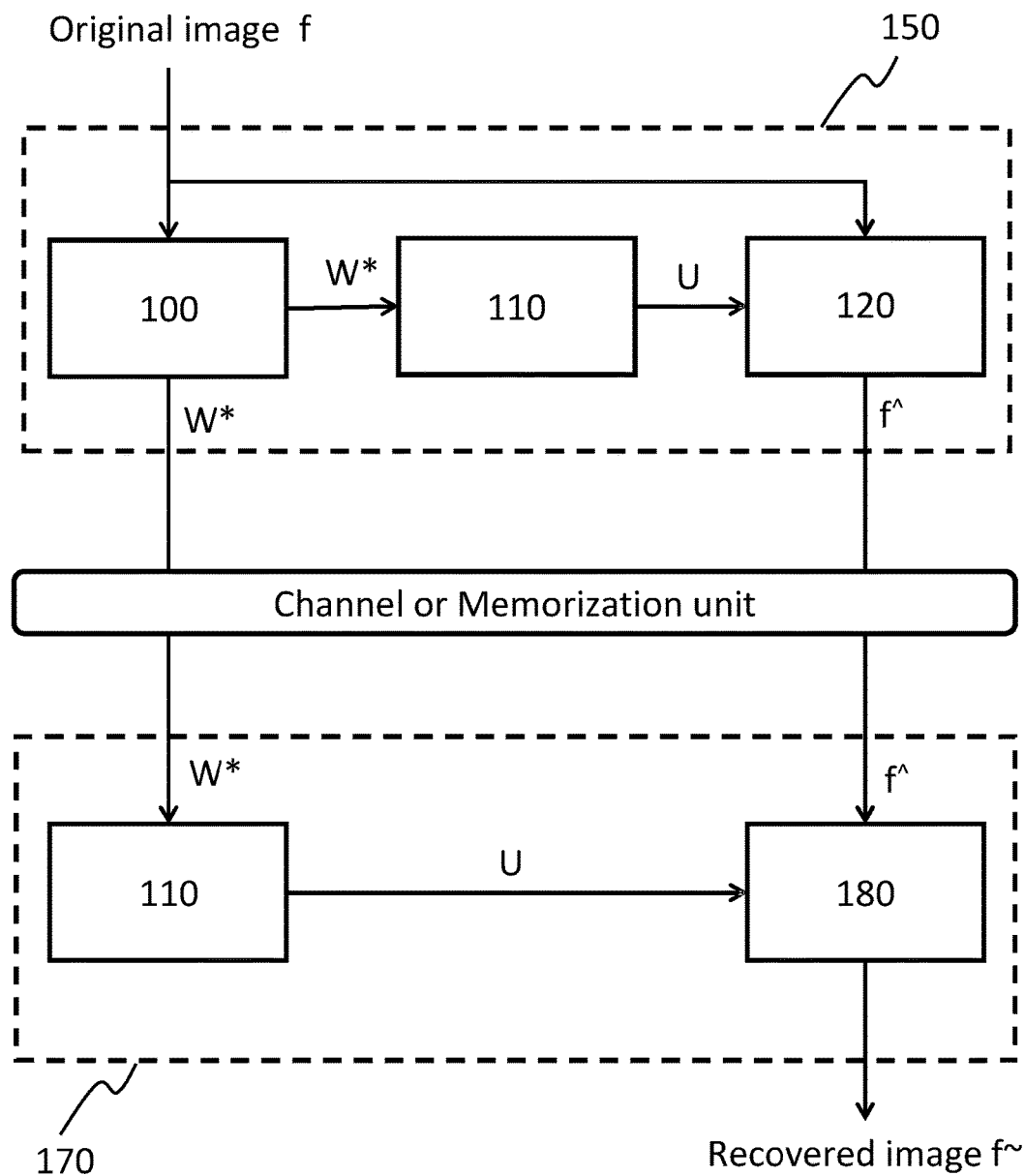
FIG. 1 shows a block diagram of a reference graph-based image encoding-decoding system according to the state of art.

Concluding, FIG. 15(b) shows that the performance of the architecture proposed in this invention (curve "quantized weights (two values) and edge prediction"), in which the weights graph is quantized and predicted, is very close to that of the reference architecture (curve "unquantized weights") as illustrated in FIG. 1 where the weights graph does not undergo any form of quantization or prediction.

Other Embodiments and Generalizations

In a second embodiment of the present invention, the image to be coded may be preliminarily filtered so to remove high frequency components. Examples of appropriate filters include Gaussian or an anisotropic filter.

In a third embodiment, the invention can be adapted so as to be used for compressing also color images. In case of an RGB image, for example, the invention can be used to compress at least one of the R, G, or B components; since the components are in general strongly correlated, at least as far as the edges are concerned, it is possible to infer or predict the edges of the other components basing on those of the starting one. Analogously, in case of a YUV coded color image, the luminance component Y can be compressed according to the invention, while the chroma components U and V can be compressed and decompressed in a similar way as their difference signal from Y (Y-U and Y-V), with some adaptations taking into account the different statistical features of the chroma components with respect to luminance.

In a fourth embodiment, the invention is integrated in a video coding technique wherein also the temporal correlation between different images is taken into account. To that end, a prediction mechanism similar to those used in the conventional video compression standards can be used in combination with the invention for effectively compressing and decompressing a video signal.

The terms image and image block used in the present description as input bi-dimensional signal must be interpreted in their broadest meaning. They can encompass pixel values directly derived or extracted from a natural image, an artificial image, the prediction error of an image, a sub-sampled version of an image at higher resolution, any portion of said kind of images, or the like.

In the preferred embodiment, the distance between two pixels in the grayscale colorspace has been chosen as the absolute value of the algebraic difference between the relevant pixel value. In any embodiments, any other definitions of the distances in the pixel space can be used as a measure of the mutual resemblance of two pixels for deriving the matrix D starting from an image or any portion thereof.

In general, any kind of function can be used to assign weights to the matrix D in order to populate the W matrix; a non-linear function allows to separate more sharply the higher distances (meaning there is a border) form the lower distances (meaning there is no border). Furthermore, the skilled person can configure the non-linear weighting unit 325 in order to use other non-linear functions instead of the Cauchy for determining the weights of the W matrix associated to the matrix of distances D, without departing from the teaching of the present invention.

The vectorizing process described for deriving a uni-dimensional vectorial representation of an image or a portion thereof is merely optional and non essential for implementing the present invention. It simply allows a compacter representation of the image input data and a simpler data structure and processing of the distances and weights matrixes. Other kind of representations and data structures can be used for the input image or its blocks and, conversely, for the distance and weight matrixes as well, whose structures, in general depend on those of the input image data.

The same consideration applies to the vectorial representation of the edge map: it is not strictly necessary for embodying the invention to use such a mono-dimensional data structure; depending on the representation used for the distance and weight matrixes also other solutions are possible, like for example a bi-dimensional matrix. The vectorial representation described in detail above has the advantage to be particularly simple and easy to be processed.

In constructing the prediction model of the discontinuities of an image or a portion thereof, the horizontal and vertical closest pixels, if any, are considered, according to an embodiment of the invention, as described so far. The skilled person can configure other embodiments of the invention in order to use more complicated adjacency areas (pixel patterns): for example also the closest diagonal pixels can be considered for establishing whether a given pixel pertains to an edge; its distance in the pixel space can be measured and it can be consequently weighted. Additionally, also more distant pixels can be involved in the edge prediction of the image and in the relevant reconstruction.

Also the isolated edge removal unit can use a different neighbouring regions and a different threshold value in deciding whether to remove the isolated edges from the edge map. For example also pixel displaced by two lines or columns can be involved in the process; their values can be considered in the removal decision with different weights, depending on their distance from the reference pixel at stake.

The dimensions of the image blocks mentioned in describing an embodiment of the invention are exemplificative. In other embodiments they can be of any size, form a rectangle or a square, be homogeneous for the entire image or adaptive to the local features of the image. For example the image blocks can be smaller for image areas having more complex edges and larger for those areas having few or no edges.

In another embodiment, the image may be preliminarily subdivided in smaller blocks preferably composed each of the same number of N pixels, which are then independently encoded and decoded according to the present invention. If necessary stuffing (padding) pixel can be added in order to have the encoder and decoder operating on blocks of the same (predetermined) size. This added pixel can be removed by the decoding device after having reconstructed the image f.

In another embodiment, the binary edge map f' is further compressed with existing entropy coding techniques prior to its transmission on the channel with the goal to further reduce the bandwidth required for its representation and is decompressed at the receiver prior it is processed by the graph decoding unit.

In other embodiments of the invention, the graph transform coefficients f^, usually contained in a vector, are determined on the basis of the reconstructed weight map W' in any other way than that illustrated herewith, i.e., by computing the graph transform coefficients f^ via a graph transform matrix U composed by the eigenvectors of the graph Laplacian matrix of W'.

The skilled person can easily configure the encoding and decoding apparatuses to determine the direct and inverse transform matrixes $U, U^{-1}$ in many different ways, without departing from the teaching of the present invention.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for encoding digital images, comprising:
   input means configured for acquiring at least a portion of an image (f) from a source,
   output means configured for transmitting at least a portion of an encoded image to a destination, processing means configured for reading at least a portion of said image (f), wherein the processing means are configured for computing difference values between each pixel value of said portion of the image and each value of adjacent pixels of the same portion, determining quantized pixel difference values by quantizing said difference values on the basis of quantization information, determining a weight map (W) on the basis of said quantized pixel difference values, wherein the processing means are also configured for computing an edge map (f') composed by elements ($f'_{ij}$) indicating whether a corresponding pixel of said at least a portion of an image is an edge or not, wherein each of said elements is labelled as edge ("b") or non-edge ("w") on the basis of the values of said weight map (W) associated to the image pixel corresponding to said element and to at least one image pixel adjacent to said image pixel corresponding to said element, determining a reconstructed weight map (W') on the basis of the edge map (f') by assigning a higher (M) or lower (m) value to the weight ($w'_{ij}$) representing the similarity between two given pixels of the image on the basis of the number of said edges ("b") in the edge map (f') that are horizontal and/or vertical neighbours of one of said two given pixels, determining a graph transform matrix (U) derived from said reconstructed weight map (W'), determining transform coefficients (f^) on the basis of said graph transform matrix (U) and said portion of the image (f), transmitting, by the output means, said computed transform coefficients (f^) and said edge map (f') to said destination.

2. The encoding apparatus according to claim 1, wherein said adjacent pixels are the pixels which are on top, left, bottom and right of said pixel.

3. The encoding apparatus according to claim 1, wherein the processing means are also configured for computing the edge map (f') by mapping each element of the weight map (W) to only two possible symbols on the basis of quantizing information which comprises a threshold value and two values associated to said two symbols, respectively.

4. The encoding apparatus according to claim 1, wherein the processing means are also configured for processing the edge map (f') in order to delete the isolated edges which have no neighbour edge.

5. The encoding apparatus according to claim 1, wherein said horizontal and/or vertical neighbours comprise at least two neighbours lying on the right and bottom of said element of the edge map (f').

6. An apparatus for decoding digital images, comprising:
input means configured for acquiring at least a compressed portion of an image (f) from a communication channel or a storage media, output video means configured for outputting a reconstructed image (f~), processing means configured for receiving, through the input means, transform coefficients (f^), and an edge map (f') denoting for each pixel of the image whether the pixel is an edge ("b") or not ("w"), wherein the processing means are also configured for:
determining a reconstructed weight map (W') on the basis of said edge map (f') by assigning a higher (M) or lower (m) value to the weight ($w'_{ij}$) representing the similarity between two given pixels of the image on the basis of the number of said edges ("b") in the edge map (f') that are horizontal and/or vertical neighbours of one of said two given pixels, determining an inverse graph transform matrix ($U^{-1}$) on the basis of said reconstructed weight map (W'), computing the reconstructed image (f~) on the basis of the inverse graph transform matrix ($U^{-1}$) and the transform coefficients (f^), outputting, through said output video means, the reconstructed image (f~).

7. The decoding apparatus according to claim 6, wherein said horizontal and/or vertical neighbours comprise at least two neighbours lying on the right and bottom of said element of the edge map (f').

8. The decoding apparatus according to claim 6, wherein a lower (m) value is assigned to the weight ($w'_{ij}$) if the number of said edges ("b") in the edge map (f') that are horizontal and/or vertical neighbours of one of said two given pixels is higher than zero.

9. A method for encoding digital images or video streams, comprising:
a receiving step, wherein at least a portion of an image (f) is received of input means, a weight-map computation step, wherein a weight map (W) is determined by computing, through processing means, difference values between the value of each pixel of said portion of the image (f) and each value of adjacent pixels of the same portion, wherein the method further comprises an edge-map computation step, wherein an edge map (f') is computed, through the processing means, by quantizing the pixel differences values, which are used for determining the weight map (W), on the basis of quantizing information, wherein the edge map (f') is composed by elements ($f'_{ij}$) indicating whether a corresponding pixel of said at least a portion of an image is an edge or not, wherein each of said elements is labelled as edge ("b") or non-edge ("w") on the basis of the quantized pixel difference values associated to the image pixel corresponding to said element and to at least one image pixel adjacent to said image pixel corresponding to said element, and wherein said edge map (f') is transmitted and/or stored by output means, a weights map recovery step, wherein a reconstructed weight map (W') is determined by assigning a higher (M) or lower (m) value to the weight representing the similarity between two given pixels of the image ($w'_{ij}$) on the basis of the number of said edges ("b") in the edge map (f') that are horizontal and/or vertical neighbours of one of said two given pixels, a graph transform matrix computation step, wherein a graph transform matrix (U) is determined, by the processing means, on the basis of said reconstructed weight map (W'), a transform coefficients computation step, wherein transform coefficients (f^) are determined, by the processing means, on the basis of said graph transform matrix (U) and said portion of the image (f), and wherein said transform coefficients (f^) and said edge map are transmitted and/or stored by the output means.

10. The encoding method according to claim 9, wherein, during the weight-map computation step, said adjacent pixels are the pixels which are on top, left, bottom and right of said pixel.

11. The encoding method according to claim 9, wherein, during the edge-map computation step, the edge map (f') is determined by mapping each element of the weight map (W)

to only two possible symbols on the basis of the quantizing information which comprises a threshold value and two values associated to said two symbols, respectively.

12. The encoding method according to claim 9, comprising an edge map processing step, wherein the edge map (f') is processed, by the processing means, in order to delete the isolated edges which have no neighbour edge.

13. The encoding method according to claim 9, wherein, said horizontal and/or vertical neighbours comprise at least two neighbours lying on the right and bottom of said element of the edge map (f').

14. A method for decoding digital images, comprising:
a first receiving step, wherein transform coefficients (f^) are received by input means,
a second receiving step, wherein an edge map (f') is received by the input means, said edge map (f') denoting for each pixel of the image whether the pixel is an edge ("b") or not ("w"),
wherein it also comprises
a weight-map reconstruction step, wherein a reconstructed weight map (W') is determined, by the processing means, on the basis of said edge map (f') by assigning a higher (M) or lower (m) value to the weight ($w'_{ij}$) representing the similarity between two given pixels of the image on the basis of the number of said edges ("b") in the edge map (f') that are horizontal and/or vertical neighbours of one of said two given pixels,
an inverse graph transform matrix computation step, wherein an inverse graph transform matrix ($U^{-1}$) is determined on the basis of said reconstructed weight map (W') by the processing means,
an image reconstruction step, wherein at least a reconstructed image (f~) is determined, by the processing means, on the basis of said inverse graph transform matrix ($U^{-1}$) and the transform coefficients (f^), and wherein said reconstructed image (f~) is outputted by output video means.

15. The encoding apparatus according to claim 1, wherein a lower (m) value is assigned to the weight ($w'_{ij}$) if the number of said edges ("b") in the edge map (f') that are horizontal and/or vertical neighbours of one of said two given pixels is higher than zero.

* * * * *

UNITED STATES PATENT AND TRADEMARK OFFICE
CERTIFICATE OF CORRECTION

PATENT NO. : 10,609,373 B2  
APPLICATION NO. : 15/759631  
DATED : March 31, 2020  
INVENTOR(S) : Fracastoro et al.

It is certified that error appears in the above-identified patent and that said Letters Patent is hereby corrected as shown below:

On the Title Page

At page 2, Column 1, Line 3, delete "15 claims" and insert --14 claims--

In the Claims

Column 21  
Lines 26-27, Claim 1 change "one of said two given pixels" to –the elements ($f'_i$)–  
Lines 50-52, Claim 6 change "said horizontal and/or vertical neighbours comprise at least two neighbors lying on the right and bottom of said element of the edge map (f')" to –when computing said edge map (f'), said at least one image pixel adjacent to the image pixel corresponding to said element ($f'_i$) comprises at least two neighbour pixels lying on the right and on the bottom of said image pixel–

Column 22  
Lines 2-3, Claim 6 change "one of said two given pixels" to –the elements ($f'_i$)–  
Lines 11-14, please cancel Claim 7  
Lines 18-19, Claim 8 change "one of said two given pixels" to –the elements ($f'_i$)–  
Line 50, Claim 9 change "one of said two given pixels" to –the elements ($f'_i$)–

Column 23  
Lines 9-11, Claim 13 change "said horizontal and/or vertical neighbours comprise at least two neighbours lying on the right and bottom of said element of the edge map (f')" to –when computing said edge map (f'), said at least one image pixel adjacent to the image pixel corresponding to said element ($f'_i$) comprises at least two neighbour pixels lying on the right and on the bottom of said image pixel–

Column 24  
Lines 5-6, Claim 14 change "one of said two given pixels" to –the elements ($f'_i$)–  
Lines 20-21, Claim 15 change "one of said two given pixels" to –the elements ($f'_i$)–

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*